US008488761B2

(12) United States Patent
Reding et al.

(10) Patent No.: US 8,488,761 B2
(45) Date of Patent: Jul. 16, 2013

(54) METHODS AND SYSTEMS FOR A CALL LOG

(75) Inventors: Craig L. Reding, Midland Park, NJ (US); John R. Reformato, East Meadow, NJ (US); Mahesh Rajagopalan, Irving, TX (US); Shadman Zafar, Coppell, TX (US); John Wurster, Basking Ridge, NJ (US)

(73) Assignees: Verizon Data Services LLC, Temple Terrace, FL (US); Verizon Services Corp., Ashburn, VA (US); Telesector Resources Group, Inc., New York, NY (US)

( * ) Notice: Subject to any disclaimer, the term of this patent is extended or adjusted under 35 U.S.C. 154(b) by 974 days.

(21) Appl. No.: 10/720,870

(22) Filed: Nov. 24, 2003

(65) Prior Publication Data
US 2005/0117729 A1 Jun. 2, 2005

Related U.S. Application Data

(63) Continuation-in-part of application No. 10/083,793, filed on Feb. 27, 2002, and a continuation-in-part of application No. 10/083,792, filed on Feb. 27, 2002, now Pat. No. 7,142,646, and a continuation-in-part of application No. 10/083,884, filed on Feb. 27, 2002, now Pat. No. 7,190,773, and a continuation-in-part of application No. 10/083,822, filed on Feb. 27, 2002, now abandoned.

(60) Provisional application No. 60/272,122, filed on Feb. 27, 2001, provisional application No. 60/272,167, filed on Feb. 27, 2001, provisional application No. 60/275,667, filed on Mar. 13, 2001, provisional application No. 60/275,020, filed on Mar. 13, 2001, provisional application No. 60/275,031, filed on Mar. 13, 2001, provisional application No. 60/276,505, filed on Mar. 19, 2001, provisional application No. 60/428,704, filed on Nov. 25, 2002, provisional application No. 60/436,018, filed on Dec. 26, 2002, provisional application No. 60/275,719, filed on Mar. 13, 2001.

(51) Int. Cl.
| H04M 1/66 | (2006.01) |
| H04M 3/42 | (2006.01) |
| H04M 1/56 | (2006.01) |
| H04M 15/06 | (2006.01) |

(52) U.S. Cl.
USPC .................. 379/200; 379/142.01; 379/207.15

(58) Field of Classification Search
USPC ................ 379/200, 142.06, 70, 67.1, 355.05, 379/142.14, 93.28, 130, 207.15, 88.2, 88.19, 379/142.01, 142.04; 370/352; 707/1; 455/405
See application file for complete search history.

(56) References Cited

U.S. PATENT DOCUMENTS

| 4,013,839 A | 3/1977 | Bell |
| 4,540,850 A | 9/1985 | Herr et al. .................. 379/88.19 |

(Continued)

FOREIGN PATENT DOCUMENTS

| CA | 2240878 | 12/1998 |
| DE | 10110942 | 9/2002 |

(Continued)

OTHER PUBLICATIONS

"The Mobile Phone User Guide", http://www.mobileshop.org/usertech/wildfire.htm, printed Oct. 1, 2004.

(Continued)

Primary Examiner — Thjuan K Addy

(57) ABSTRACT

A call log associated with outgoing calls originating from calling devices may be established and maintained. Filter parameters may be set to specify which outgoing calls to log. Outgoing call information associated with calls originating from a user's calling devices may be obtained and transmitted to a service center. A server in the service center may determine whether or not to log the outgoing call information based on the filter settings. The outgoing call information may be stored in the call log, which may reside in a database in the service center. The user may access the call log from a user terminal and/or the calling devices. The call log may be used to add contacts to a contact list and facilitate data analyses.

36 Claims, 7 Drawing Sheets

U.S. PATENT DOCUMENTS

| | | | |
|---|---|---|---|
| 4,600,814 A | 7/1986 | Cunniff et al. | |
| 4,734,931 A | 3/1988 | Bourg et al. | |
| 4,924,496 A * | 5/1990 | Figa et al. | 379/142.06 |
| 5,014,303 A | 5/1991 | Velius | |
| 5,168,515 A | 12/1992 | Gechter et al. | |
| 5,222,125 A | 6/1993 | Creswell et al. | |
| 5,274,700 A | 12/1993 | Gechter et al. | |
| 5,327,486 A | 7/1994 | Wolff et al. | 379/93.23 |
| 5,329,578 A | 7/1994 | Brennan et al. | |
| 5,428,663 A | 6/1995 | Grimes et al. | |
| 5,440,624 A | 8/1995 | Schoof | |
| 5,483,586 A | 1/1996 | Sussman | |
| 5,533,096 A | 7/1996 | Bales | |
| 5,535,265 A * | 7/1996 | Suwandhaputra | 379/93.28 |
| 5,548,636 A | 8/1996 | Bannister et al. | |
| 5,550,907 A | 8/1996 | Carlsen | |
| 5,583,564 A | 12/1996 | Rao et al. | |
| 5,586,173 A | 12/1996 | Misholi et al. | |
| 5,588,037 A | 12/1996 | Fuller et al. | |
| 5,608,788 A | 3/1997 | Demlow et al. | |
| 5,619,555 A | 4/1997 | Fenton et al. | |
| 5,621,787 A | 4/1997 | McKoy et al. | |
| 5,623,541 A | 4/1997 | Boyle et al. | |
| 5,631,904 A | 5/1997 | Fitser et al. | 370/261 |
| 5,638,434 A | 6/1997 | Gottlieb et al. | |
| 5,649,105 A | 7/1997 | Aldred et al. | |
| 5,652,789 A | 7/1997 | Miner et al. | 379/201 |
| 5,661,788 A | 8/1997 | Chin | |
| 5,668,863 A | 9/1997 | Bieselin et al. | |
| 5,673,080 A | 9/1997 | Biggs et al. | |
| 5,692,213 A | 11/1997 | Goldberg et al. | |
| 5,710,591 A | 1/1998 | Bruno et al. | |
| 5,712,903 A | 1/1998 | Bartholomew et al. | |
| 5,715,444 A | 2/1998 | Danish et al. | |
| 5,717,863 A | 2/1998 | Adamson et al. | |
| 5,719,925 A | 2/1998 | Peoples | |
| 5,724,412 A | 3/1998 | Srinivasan | |
| 5,742,095 A | 4/1998 | Bryant et al. | |
| 5,742,668 A | 4/1998 | Pepe et al. | |
| 5,742,905 A | 4/1998 | Pepe et al. | |
| 5,745,561 A | 4/1998 | Baker et al. | |
| 5,745,884 A | 4/1998 | Carnegie et al. | |
| 5,751,800 A | 5/1998 | Ardon | |
| 5,752,191 A | 5/1998 | Fuller et al. | |
| 5,764,901 A | 6/1998 | Skarbo et al. | |
| 5,805,670 A | 9/1998 | Pons et al. | |
| 5,841,837 A | 11/1998 | Fuller et al. | |
| 5,864,603 A | 1/1999 | Haavisto et al. | |
| 5,872,841 A | 2/1999 | King et al. | |
| 5,875,242 A | 2/1999 | Glaser et al. | 379/207 |
| 5,875,437 A | 2/1999 | Atkins | |
| 5,903,845 A | 5/1999 | Buhrmann et al. | 455/461 |
| 5,907,324 A | 5/1999 | Larson et al. | |
| 5,907,547 A | 5/1999 | Foladare et al. | 370/352 |
| 5,917,817 A | 6/1999 | Dunn et al. | |
| 5,917,912 A | 6/1999 | Ginter et al. | |
| 5,920,826 A | 7/1999 | Metso et al. | |
| 5,920,847 A | 7/1999 | Kolling et al. | |
| 5,926,535 A | 7/1999 | Reynolds | |
| 5,944,769 A | 8/1999 | Musk et al. | |
| 5,945,989 A | 8/1999 | Freishtat et al. | |
| 5,960,342 A | 9/1999 | Liem et al. | |
| 5,963,925 A | 10/1999 | Kolling et al. | |
| 5,982,870 A | 11/1999 | Pershan et al. | |
| 6,005,870 A | 12/1999 | Leung et al. | |
| 6,018,571 A | 1/2000 | Langlois et al. | |
| 6,018,737 A | 1/2000 | Shah et al. | |
| 6,021,428 A | 2/2000 | Miloslavsky | |
| 6,029,151 A | 2/2000 | Nikander | |
| 6,031,896 A | 2/2000 | Gardell et al. | |
| 6,041,103 A | 3/2000 | La Porta et al. | |
| 6,052,372 A | 4/2000 | Gittins et al. | |
| 6,058,163 A | 5/2000 | Pattison et al. | |
| 6,061,432 A | 5/2000 | Wallace et al. | |
| 6,078,658 A | 6/2000 | Yunoki | |
| 6,100,882 A | 8/2000 | Sharman et al. | |
| 6,122,348 A | 9/2000 | French-St. Geroge et al. | |
| 6,134,318 A | 10/2000 | O'Neil | |
| 6,134,548 A | 10/2000 | Gottsman et al. | |
| 6,144,671 A | 11/2000 | Perinpanathan et al. | |
| 6,154,646 A | 11/2000 | Tran et al. | |
| 6,161,008 A | 12/2000 | Lee et al. | |
| 6,163,692 A | 12/2000 | Chakrabarti et al. | |
| 6,167,119 A | 12/2000 | Bartholomew et al. | |
| 6,188,756 B1 | 2/2001 | Mashinsky | |
| 6,189,026 B1 | 2/2001 | Birrell et al. | |
| 6,192,123 B1 | 2/2001 | Grunsted et al. | 379/350 |
| 6,195,660 B1 | 2/2001 | Polnerow et al. | |
| 6,215,863 B1 | 4/2001 | Bennett et al. | |
| 6,219,413 B1 | 4/2001 | Burg | 379/215.01 |
| 6,226,374 B1 | 5/2001 | Howell et al. | 379/207 |
| 6,240,449 B1 | 5/2001 | Nadeau | |
| 6,260,050 B1 | 7/2001 | Yost et al. | |
| 6,275,575 B1 | 8/2001 | Wu | |
| 6,282,522 B1 | 8/2001 | Davis et al. | |
| 6,298,062 B1 | 10/2001 | Gardell et al. | |
| 6,298,129 B1 | 10/2001 | Culver et al. | |
| 6,301,338 B1 | 10/2001 | Makela et al. | |
| 6,301,609 B1 | 10/2001 | Aravamudan et al. | 709/207 |
| 6,310,939 B1 | 10/2001 | Varney | |
| 6,310,947 B1 | 10/2001 | Polcyn | 379/211.01 |
| 6,324,269 B1 | 11/2001 | Malik | |
| 6,333,973 B1 | 12/2001 | Smith et al. | |
| 6,349,299 B1 | 2/2002 | Spencer et al. | |
| 6,351,279 B1 | 2/2002 | Sawyer | |
| 6,363,143 B1 | 3/2002 | Fox | |
| 6,371,484 B1 | 4/2002 | Yuan | |
| 6,373,817 B1 | 4/2002 | Kung et al. | |
| 6,373,930 B1 | 4/2002 | McConnell et al. | |
| 6,385,754 B1 | 5/2002 | Mizumoto et al. | |
| 6,404,873 B1 | 6/2002 | Beyda et al. | |
| 6,408,191 B1 | 6/2002 | Blanchard et al. | |
| 6,408,327 B1 | 6/2002 | McClennon et al. | |
| 6,411,605 B1 | 6/2002 | Vance et al. | |
| 6,418,214 B1 | 7/2002 | Smythe et al. | |
| 6,430,176 B1 | 8/2002 | Christie | |
| 6,430,289 B1 | 8/2002 | Liffick | 379/900 |
| 6,434,226 B1 | 8/2002 | Takahashi | |
| 6,442,245 B1 | 8/2002 | Castagna et al. | |
| 6,442,251 B1 | 8/2002 | Maes et al. | |
| 6,442,748 B1 | 8/2002 | Bowman-Amuah | |
| 6,453,031 B2 | 9/2002 | Malik | |
| 6,453,167 B1 | 9/2002 | Michaels et al. | |
| 6,459,780 B1 | 10/2002 | Wurster et al. | 379/142.02 |
| 6,459,913 B2 | 10/2002 | Cloutier | |
| 6,463,145 B1 | 10/2002 | O'Neal et al. | 379/211.02 |
| 6,463,464 B1 | 10/2002 | Lazaridis et al. | |
| 6,466,910 B1 | 10/2002 | Desmond et al. | |
| 6,470,079 B1 | 10/2002 | Benson | |
| 6,473,615 B1 | 10/2002 | Theppasandra et al. | |
| 6,477,374 B1 | 11/2002 | Shaffer et al. | 455/445 |
| 6,480,830 B1 | 11/2002 | Ford et al. | |
| 6,480,890 B1 | 11/2002 | Lee, Jr. et al. | |
| 6,507,644 B1 | 1/2003 | Henderson et al. | |
| 6,519,326 B1 | 2/2003 | Milewski et al. | |
| 6,522,734 B1 | 2/2003 | Allen et al. | |
| 6,526,134 B1 | 2/2003 | Wallenius | |
| 6,532,285 B1 | 3/2003 | Tucker et al. | |
| 6,535,596 B1 | 3/2003 | Frey et al. | |
| 6,539,082 B1 | 3/2003 | Lowe et al. | |
| 6,542,596 B1 | 4/2003 | Hill et al. | |
| 6,546,005 B1 | 4/2003 | Berkley et al. | 370/353 |
| 6,547,830 B1 | 4/2003 | Mercer | |
| 6,560,329 B1 | 5/2003 | Draginich et al. | |
| 6,563,914 B2 | 5/2003 | Sammon et al. | |
| 6,564,261 B1 | 5/2003 | Gudjonsson et al. | 709/227 |
| 6,574,324 B1 | 6/2003 | Malik | |
| 6,574,470 B1 | 6/2003 | Chow et al. | |
| 6,577,622 B1 | 6/2003 | Schuster et al. | 370/352 |
| 6,577,720 B1 | 6/2003 | Sutter | |
| 6,584,122 B1 | 6/2003 | Matthews et al. | 370/493 |
| 6,590,603 B2 | 7/2003 | Sheldon et al. | |
| 6,590,969 B1 | 7/2003 | Peters et al. | |
| 6,593,352 B2 | 7/2003 | Smith | |
| 6,594,470 B1 | 7/2003 | Barnes et al. | |
| 6,600,736 B1 | 7/2003 | Ball et al. | |
| 6,609,113 B1 | 8/2003 | O'Leary et al. | |

| | | |
|---|---|---|
| 6,611,590 B1 | 8/2003 | Lu et al. |
| 6,614,786 B1 | 9/2003 | Byers ......................... 370/353 |
| 6,618,710 B1 | 9/2003 | Zondervan et al. |
| 6,625,258 B1 | 9/2003 | Ram et al. |
| 6,628,194 B1 | 9/2003 | Hellebust et al. |
| 6,628,770 B1 | 9/2003 | Jain et al. |
| 6,631,186 B1 | 10/2003 | Adams et al. |
| 6,636,587 B1 | 10/2003 | Nagai et al. |
| 6,643,356 B1 | 11/2003 | Hickey et al. |
| 6,654,768 B2 | 11/2003 | Celik |
| 6,661,340 B1 | 12/2003 | Saylor et al. |
| 6,665,388 B2 | 12/2003 | Bedingfield |
| 6,668,046 B1 | 12/2003 | Albal |
| 6,668,049 B1 | 12/2003 | Koch et al. |
| 6,681,119 B1 | 1/2004 | Verdonk |
| 6,683,939 B1 * | 1/2004 | Chiloyan et al. .................. 379/70 |
| 6,687,362 B1 | 2/2004 | Lindquist et al. |
| 6,690,672 B1 | 2/2004 | Klein |
| 6,693,897 B1 | 2/2004 | Huang |
| 6,697,461 B1 | 2/2004 | Middleswarth et al. |
| 6,697,796 B2 | 2/2004 | Kermani |
| 6,704,294 B1 | 3/2004 | Cruickshank |
| 6,711,158 B1 | 3/2004 | Kahane et al. |
| 6,717,938 B1 | 4/2004 | D'Angelo |
| 6,718,026 B1 | 4/2004 | Pershan et al. |
| 6,724,887 B1 | 4/2004 | Eibacher et al. |
| 6,731,238 B2 | 5/2004 | Johnson |
| 6,735,292 B1 | 5/2004 | Johnson |
| 6,738,458 B1 | 5/2004 | Cline et al. |
| 6,744,861 B1 | 6/2004 | Pershan et al. |
| 6,747,970 B1 | 6/2004 | Lamb et al. |
| 6,748,054 B1 | 6/2004 | Gross et al. |
| 6,757,365 B1 | 6/2004 | Bogard |
| 6,768,788 B1 | 7/2004 | Langseth et al. |
| 6,768,790 B1 | 7/2004 | Manduley et al. |
| 6,771,949 B1 | 8/2004 | Corliss |
| 6,775,267 B1 | 8/2004 | Kung et al. |
| 6,775,546 B1 | 8/2004 | Fuller |
| 6,788,772 B2 * | 9/2004 | Barak et al. ..................... 379/130 |
| 6,788,775 B1 | 9/2004 | Simpson |
| 6,792,092 B1 | 9/2004 | Michalewicz |
| 6,798,753 B1 | 9/2004 | Doganata et al. |
| 6,801,610 B1 | 10/2004 | Malik |
| 6,807,258 B1 | 10/2004 | Malik |
| 6,807,259 B1 | 10/2004 | Patel et al. |
| 6,816,468 B1 | 11/2004 | Czuickshank |
| 6,816,469 B1 | 11/2004 | Kung et al. |
| 6,820,055 B2 | 11/2004 | Saindon et al. |
| 6,842,460 B1 | 1/2005 | Olkkonen et al. |
| 6,847,823 B2 | 1/2005 | Lehikoinen et al. |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,876,632 B1 | 4/2005 | Takeda |
| 6,876,736 B2 | 4/2005 | Lamy et al. |
| 6,882,714 B2 * | 4/2005 | Mansfield ................. 379/142.14 |
| 6,882,838 B1 | 4/2005 | Lee et al. |
| 6,885,742 B1 | 4/2005 | Smith |
| 6,907,111 B1 | 6/2005 | Zhang et al. |
| 6,917,610 B1 * | 7/2005 | Kung et al. ..................... 370/352 |
| 6,944,279 B2 | 9/2005 | Elsey et al. |
| 6,947,538 B2 | 9/2005 | Shen et al. |
| 6,954,521 B2 | 10/2005 | Bull et al. |
| 6,954,524 B2 | 10/2005 | Gibson |
| 6,956,942 B2 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,970,705 B2 | 11/2005 | Yoshimoto et al. |
| 6,996,227 B2 * | 2/2006 | Albal et al. ................ 379/355.05 |
| 6,996,370 B2 | 2/2006 | DeLoye et al. |
| 6,999,563 B1 | 2/2006 | Thorpe et al. |
| 7,024,209 B1 | 4/2006 | Gress et al. |
| 7,027,435 B2 | 4/2006 | Bardehle |
| 7,031,437 B1 | 4/2006 | Parsons et al. |
| 7,043,521 B2 | 5/2006 | Eitel |
| 7,065,198 B2 | 6/2006 | Brown et al. |
| 7,068,768 B2 | 6/2006 | Barnes |
| 7,076,528 B2 | 7/2006 | Premutico |
| 7,099,288 B1 | 8/2006 | Parker et al. |
| 7,107,312 B2 | 9/2006 | Hackbarth et al. |
| 7,116,972 B1 | 10/2006 | Zhang et al. |
| 7,127,050 B2 | 10/2006 | Walsh et al. |
| 7,130,390 B2 | 10/2006 | Abburi |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,155,001 B2 | 12/2006 | Tiliks et al. |
| 7,174,306 B1 | 2/2007 | Haseltine |
| 7,181,417 B1 | 2/2007 | Langseth et al. |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al. |
| 7,245,929 B2 | 7/2007 | Henderson et al. |
| 7,254,220 B1 | 8/2007 | Reding et al. |
| 7,254,643 B1 | 8/2007 | Peters et al. |
| 7,283,808 B2 | 10/2007 | Castell et al. |
| 7,289,489 B1 | 10/2007 | Kung et al. |
| 7,308,087 B2 | 12/2007 | Joyce et al. |
| 7,315,614 B2 | 1/2008 | Bedingfield et al. |
| 7,379,538 B1 | 5/2008 | Ali et al. |
| 7,418,090 B2 | 8/2008 | Reding et al. |
| 7,428,580 B2 | 9/2008 | Hullfish et al. |
| 7,546,337 B1 | 6/2009 | Crawford |
| 7,616,747 B2 | 11/2009 | Wurster et al. |
| 7,912,193 B2 | 3/2011 | Chingon et al. |
| 2001/0003202 A1 | 6/2001 | Mache et al. |
| 2001/0012286 A1 | 8/2001 | Huna et al. |
| 2001/0014863 A1 | 8/2001 | Williams, III |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1 | 11/2001 | Brachman et al. |
| 2001/0043689 A1 | 11/2001 | Malik |
| 2001/0043690 A1 | 11/2001 | Bakshi et al. |
| 2001/0043691 A1 | 11/2001 | Bull et al. |
| 2001/0051534 A1 | 12/2001 | Amin |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber et al. |
| 2002/0055351 A1 | 5/2002 | Elsey et al. |
| 2002/0057678 A1 | 5/2002 | Jiang et al. |
| 2002/0062251 A1 | 5/2002 | Anandan et al. |
| 2002/0064268 A1 | 5/2002 | Pelletier |
| 2002/0069060 A1 | 6/2002 | Cannavo et al. |
| 2002/0069096 A1 | 6/2002 | Lindoerfer et al. |
| 2002/0071539 A1 | 6/2002 | Diament et al. |
| 2002/0073163 A1 | 6/2002 | Churchill et al. |
| 2002/0075303 A1 | 6/2002 | Thompson et al. |
| 2002/0075306 A1 | 6/2002 | Thompson et al. |
| 2002/0076022 A1 | 6/2002 | Bedingfield |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper ................... 379/201.01 |
| 2002/0082028 A1 | 6/2002 | Wittenkamp |
| 2002/0082030 A1 | 6/2002 | Berndt et al. |
| 2002/0083462 A1 | 6/2002 | Arnott ....................... 348/14.08 |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0100798 A1 | 8/2002 | Farrugia et al. |
| 2002/0103864 A1 | 8/2002 | Rodman et al. |
| 2002/0103898 A1 | 8/2002 | Moyer et al. |
| 2002/0110121 A1 | 8/2002 | Mishra ......................... 370/389 |
| 2002/0115471 A1 | 8/2002 | DeLoye et al. |
| 2002/0122545 A1 | 9/2002 | Schwab et al. |

| | | |
|---|---|---|
| 2002/0126817 A1 | 9/2002 | Hariri et al. |
| 2002/0128025 A1 | 9/2002 | Sin |
| 2002/0128033 A1 | 9/2002 | Burgess |
| 2002/0137507 A1 | 9/2002 | Winkler |
| 2002/0137530 A1 | 9/2002 | Karve |
| 2002/0138468 A1 | 9/2002 | Kermani |
| 2002/0146105 A1 | 10/2002 | McIntyre |
| 2002/0147777 A1 | 10/2002 | Hackbarth et al. |
| 2002/0147811 A1 | 10/2002 | Schwartz et al. ............. 709/225 |
| 2002/0152165 A1 | 10/2002 | Dutta et al. |
| 2002/0154210 A1 | 10/2002 | Ludwig et al. |
| 2002/0168055 A1 | 11/2002 | Crockett et al. |
| 2002/0177410 A1 | 11/2002 | Klein et al. |
| 2002/0178117 A1 | 11/2002 | Maguire et al. |
| 2003/0005150 A1 | 1/2003 | Thompson et al. |
| 2003/0014488 A1 | 1/2003 | Dalal et al. |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman et al. |
| 2003/0053612 A1 | 3/2003 | Henrikson et al. |
| 2003/0055735 A1 | 3/2003 | Cameron et al. |
| 2003/0055906 A1 | 3/2003 | Packham et al. |
| 2003/0058838 A1 | 3/2003 | Wengrovitz ................. 370/352 |
| 2003/0063732 A1 | 4/2003 | Mcknight et al. |
| 2003/0069874 A1* | 4/2003 | Hertzog et al. .................... 707/1 |
| 2003/0083040 A1* | 5/2003 | Ruth et al. .................... 455/405 |
| 2003/0092451 A1 | 5/2003 | Holloway et al. |
| 2003/0093700 A1 | 5/2003 | Yoshimoto et al. |
| 2003/0096626 A1 | 5/2003 | Sabo et al. |
| 2003/0097635 A1 | 5/2003 | Giannetti |
| 2003/0104827 A1 | 6/2003 | Moran et al. |
| 2003/0108172 A1 | 6/2003 | Petty et al. |
| 2003/0112928 A1* | 6/2003 | Brown et al. ................. 379/67.1 |
| 2003/0112952 A1 | 6/2003 | Brown et al. |
| 2003/0119532 A1 | 6/2003 | Hatch |
| 2003/0140004 A1 | 7/2003 | O'Leary et al. |
| 2003/0142798 A1 | 7/2003 | Gavette et al. |
| 2003/0147518 A1 | 8/2003 | Albal et al. |
| 2003/0149662 A1 | 8/2003 | Shore |
| 2003/0158860 A1 | 8/2003 | Caughey |
| 2003/0165223 A1 | 9/2003 | Timmins et al. |
| 2003/0167229 A1 | 9/2003 | Ludwig et al. |
| 2003/0169330 A1 | 9/2003 | Ben-Shachar et al. |
| 2003/0179743 A1 | 9/2003 | Bosik et al. |
| 2003/0179864 A1 | 9/2003 | Stillman et al. |
| 2003/0187992 A1 | 10/2003 | Steenfeldt et al. |
| 2003/0208541 A1 | 11/2003 | Musa |
| 2003/0217097 A1 | 11/2003 | Eitel |
| 2003/0228863 A1 | 12/2003 | Vander Veen et al. |
| 2004/0002350 A1 | 1/2004 | Gopinath et al. |
| 2004/0002902 A1 | 1/2004 | Muehlhaeuser |
| 2004/0019638 A1 | 1/2004 | Makagon et al. ............. 709/204 |
| 2004/0034700 A1 | 2/2004 | Polcyn |
| 2004/0037409 A1 | 2/2004 | Crockett et al. |
| 2004/0044658 A1 | 3/2004 | Crabtree et al. |
| 2004/0052356 A1 | 3/2004 | McKinzie et al. |
| 2004/0081292 A1 | 4/2004 | Brown et al. |
| 2004/0103152 A1 | 5/2004 | Ludwig et al. |
| 2004/0119814 A1 | 6/2004 | Clisham et al. |
| 2004/0127256 A1 | 7/2004 | Goldthwaite et al. |
| 2004/0156491 A1 | 8/2004 | Reding et al. |
| 2004/0184593 A1 | 9/2004 | Elsey et al. |
| 2004/0203942 A1 | 10/2004 | Dehlin |
| 2004/0208305 A1 | 10/2004 | Gross et al. |
| 2004/0236792 A1 | 11/2004 | Celik |
| 2004/0247088 A1 | 12/2004 | Lee |
| 2004/0249884 A1 | 12/2004 | Caspi et al. |
| 2004/0264654 A1 | 12/2004 | Reding et al. |
| 2005/0053206 A1 | 3/2005 | Chingon et al. |
| 2005/0053221 A1 | 3/2005 | Reding et al. |
| 2005/0102382 A1 | 5/2005 | MacGregor et al. |
| 2005/0117714 A1 | 6/2005 | Chingon et al. |
| 2005/0129208 A1 | 6/2005 | McGrath et al. |
| 2005/0149487 A1 | 7/2005 | Celik |
| 2005/0191994 A1 | 9/2005 | May et al. |
| 2005/0216421 A1 | 9/2005 | Barry et al. |
| 2005/0220286 A1 | 10/2005 | Valdez et al. |
| 2005/0243993 A1 | 11/2005 | McKinzie et al. |
| 2006/0093120 A1 | 5/2006 | Thorpe et al. |
| 2006/0095575 A1 | 5/2006 | Sureka et al. |
| 2006/0168140 A1 | 7/2006 | Inoue et al. |
| 2006/0276179 A1 | 12/2006 | Ghaffari et al. |
| 2006/0277213 A1 | 12/2006 | Robertson et al. |
| 2007/0021111 A1 | 1/2007 | Celik |
| 2009/0060155 A1 | 3/2009 | Chingon et al. |

FOREIGN PATENT DOCUMENTS

| | | |
|---|---|---|
| EP | 0818908 | 1/1988 |
| EP | 0818908 A3 | 1/1998 |
| EP | 1014630 | 6/2000 |
| EP | 1028578 | 8/2000 |
| EP | 1161063 | 12/2001 |
| EP | 1193617 | 4/2002 |
| EP | 1235387 | 8/2002 |
| EP | 1294201 | 3/2003 |
| JP | 59-169264 | 9/1984 |
| JP | 02-260750 | 10/1990 |
| JP | 04-336742 | 11/1992 |
| JP | 05-316233 | 11/1993 |
| JP | 6-113020 | 4/1994 |
| JP | 07-030664 | 1/1995 |
| JP | 07-058856 | 3/1995 |
| JP | 07-107171 | 4/1995 |
| JP | 07-107549 | 4/1995 |
| JP | 07-123098 | 5/1995 |
| JP | 08-149226 | 7/1996 |
| JP | 08-181763 | 7/1996 |
| JP | 08-298546 | 11/1996 |
| JP | 08-331642 | 12/1996 |
| JP | 09-064869 | 3/1997 |
| JP | 09-064977 | 3/1997 |
| JP | 09-083651 | 3/1997 |
| JP | 09-200350 | 7/1997 |
| JP | 09-223087 | 8/1997 |
| JP | 9-261759 | 10/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000-224301 | 8/2000 |
| JP | 2000-270307 | 9/2000 |
| JP | 2000-349902 | 12/2000 |
| JP | 2001-144859 | 5/2001 |
| JP | 2001-156921 | 6/2001 |
| JP | 2001-197210 | 7/2001 |
| JP | 2001-197562 | 7/2001 |
| JP | 2001-243231 | 9/2001 |
| JP | 2001-298545 | 10/2001 |
| JP | 2002-016673 | 1/2002 |
| JP | 2002-41522 | 2/2002 |
| JP | 2002-044123 | 2/2002 |
| JP | 2002-044257 | 2/2002 |
| JP | 2002057807 | 2/2002 |
| JP | 2002-094696 | 3/2002 |
| JP | 2002-232575 | 8/2002 |
| JP | 2002-237893 | 8/2002 |
| JP | 2002-247148 | 8/2002 |
| JP | 2002-261834 | 9/2002 |
| JP | 2002-300290 | 10/2002 |
| JP | 2002-300306 | 10/2002 |
| WO | WO-95/12948 | 5/1995 |
| WO | 96/14704 | 5/1996 |
| WO | WO-97/20423 | 6/1997 |
| WO | WO-97/33421 | 9/1997 |

| | | |
|---|---|---|
| WO | WO-98/02007 | 1/1998 |
| WO | 99/38309 | 7/1999 |
| WO | 00/45557 | 8/2000 |
| WO | WO-00/60837 | 10/2000 |
| WO | WO 00/64133 | 10/2000 |
| WO | WO01/11586 | 2/2001 |
| WO | WO 01/11586 A1 | 2/2001 |
| WO | WO-01/22751 | 3/2001 |
| WO | WO 01/35621 | 5/2001 |
| WO | 0152513 | 7/2001 |
| WO | WO 01/89212 | 11/2001 |
| WO | WO-02/25907 | 3/2002 |
| WO | 02/43338 | 5/2002 |

OTHER PUBLICATIONS

Kornowski, J., "Wildfire at Your Back and Call-A Voice-Activated Telephone Assistant That Minds You and Your Messages", http://www.lacba.org/lalawyer/techwildfire.html, pronted Oct. 1, 2004.

Cisco Personal Assistant 1.4, Cisco Systems, Jun. 24, 2003, http://www.cisco.com/en/US/products/sw/voicesw/ps2026/prod_presentation_list.html, printed Oct. 1, 2004.

"MP3 Recorder Download—MP3 Recorder—Record Audio Stream to MP3 or WAV," 2002 http://www.mp3-recorder.net, Submitted on Nov. 24, 2003.

"FAQ Premium Home Answer" eVoice, http://content.evoice.com/wcs/signUp/FAQ_premHA_s01.htm, Submitted on Nov. 24, 2003.

"Voice-ASP, White Paper Technology & Processes," eVoice, Dec. 13, 2000.

"Voice-ASP, White Paper: Market Opportunities for Enhanced Voicemail," eVoice, Nov. 10, 2000.

"Audio Digitizing Process," TalkBank, http://www.talkbank.org/da/audiodig.html, Submitted on Nov. 24, 2003.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Macromedia SoundEdit 16 Support Center-Working with Other Programs, What is Shockwave Audio Streaming?", http://www.macromedia.com/support/soundedit/how/shock/whatis.html, Submitted on Nov. 24, 2003.

"Chapter 3: Overview," last updated Dec. 2, 1999, http://service.real.com/help/library/guides/g270/htmfiles/overview.htm.

U.S. Appl. No. 09/828,679, filed Apr. 6, 2001, Reding et al.

U.S. Appl. No. 09/785,223, filed Feb. 16, 2001, Swingle et al.

"How Internet Radio Works," Howstuffworks, http://computer.howstuffworks.com/internet-radio.htm/printable, Submitted on Nov. 24, 2003.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"Real-Time Collaboration Integration in the Portal," T. Odenwald, SAP Design Guild, http://www.sapdesignguild.orq/editions/edition5/synch_collab.asp, Submitted on Nov. 24, 2003.

"NetMeeting101,", http://www.meetingbywire.com/NetMeeting101.htm, Submitted on Nov. 24, 2003.

"NetMeeting102," http://www.meetingbywire.com/NetMeetinq102.htm, Submitted on Nov. 24, 2003.

"Instructions on Application Sharing and Data Collaboration," VCON Escort and Cruiser, http://www.vide.gatech.edu/docs/share/, Submitted on Nov. 24, 2003.

"Instructions on Multipoint Application Sharing and Data Collaboration," VCON Escort and Cruiser with the RadVision MCU, http://www.vide.gatech.edu/docs/multi-share/, Submitted on Nov. 24, 2003.

"File Transfer," Microsoft Windows Technologies Windows NetMeeting, last updated Jun. 4, 1999, http://www.microsoft.com/windows/netmeeting/features/files/default.asp.

"From Dial Tone to Media Tone," Analyst: R. Mahowald, IDC, Jun. 2002.

"MediaTone—The 'Dial Tone' for Web Communications Services," Webex, 2003, Submitted on Nov. 24, 2003.

Business Solutions/Professional, http://www.accessline.com/business_sol/bs_professional_body.html, Submitted on Nov. 24, 2003.

"Accessline Comms' Accessline Service, The One-Number Wonder," CommWeb, T. Kramer, Feb. 1, 2000, http://www.cconvergence.com/article/TCM20000504S0014.

"InteleScreener," 2003, http://www.intelescreener.com/howitworks.html, Submitted on Nov. 24, 2003.

"TeleZapper from Privacy Technologies," Privacy Corps—Our Review, 2002, http://www.privacycorps.com/paces/product1.htm, Submitted on Nov. 24, 2003.

"A Proposal for Internet Call Waiting Service Using SIP," A. Brusilovsky et al., Lucent Technologies, PINT Working Group, Internet Draft, Jan. 1999.

"A Model for Presence and Instant Messaging", M. Day, et al. Fujitsu, Feb. 2000, Network Working Group, Request for Comments 2778.

"MP3 Recorder Download—MP3 Recorder—Record Audio Stream to MP3 or WAV," 2002, http://www.mp3-recorder.net, Submitted on Nov. 24, 2003.

"FAQ Premium Home Answer" eVoice, http://content.evoice.com/wcs/signUp/FAQ_prem HA_s01.htm, Submitted on Nov. 24, 2003.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%020Reports2002/53SupplementalReport(10-20-02).htm.

"Real-Time Collaboration Integration in the Portal," T. Odenvvald, SAP Design Guild, http://www.sapdesignguild.orq/editions/edition5/synch_collab.asp, Submitted on Nov. 24, 2003.

"NetMeeting101," http://www.meetingbywire.com/NetMeeting101.htm, Submitted on Nov. 24, 2003.

"NetMeeting102," http://www.meetingbywire.com/NetMeeting102.htm, Submitted on Nov. 24, 2003.

"TeleZapper from Privacy Technologies," Privacy Corps—Our Review, 2002, http://www.privacycorps.com/pages/product1.htm, Submitted on Nov. 24, 2003.

"A Model for Presence and Instant Messaging," M. Day et al., Fujitsu, Feb. 2000, Network Working Group, Request for Comments 2778.

Data Connection, Strategic Computer Technology, MeetingServer, "Broadband for Learning Case Study," Data Connection Ltd, 1998-2004, http://www.dataconnection.com/conferencing/meetingserver_casestudy.htm, Submitted on Nov. 24, 2003.

Data Connection, MailNGen, "Next Generation Messaging for Service Providers," Data Connection Limited, 2003-4, Submitted on Nov. 24, 2003.

Data Connection, Strategic Computer Technology, "Directories Explained," Data Connection Ltd, 1998-2004, http://www.dataconnection.com/inetapps/direxpl.htm, Submitted on Nov. 24, 2003.

Data Connection, Strategic Computer Technology, Directory Systems, "Directories and Meta-Directories," Data Connection Ltd, 1998-2004, http://www.dataconnection.com/inetapps/directory.htm, Submitted on Nov. 24, 2003.

Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm, Submitted on Nov. 24, 2003.

Data Connection, Strategic Software Technology, "DC-SurroundSuite for Service Providers," Data Connection Ltd, 1998-2000, http://web.archive.orq/web/20000914200355/www.dataconnection.com/messging/spssuite.htm, Submitted on Nov. 24, 2003.

Data Connection, Strategic Computer Technology, "Messaging Software Products and Services," Data Connection Ltd, 1998-2000, http://web.archive.org/web/20000819063320/www.dataconnection.com/messging/messgidx.htm, Submitted on Nov. 24, 2003.

Data Connection, Strategic Software Technology, "DC-Share for UNIX," Data Connection Ltd, 1998-2000, http://web.archive.org/web/20000914200713/www.dataconnection.com/conf/DCshare.htm, Submitted on Nov. 24, 2003.

Data Connection, Strategic Software Technology, "DC-H.323," Data Connection Ltd, 1998-2000, http://web.archive.org/web/20001120050600/www.dataconnection.com/conf/h323.htm, Submitted on Nov. 24, 2003.

Data Connection, Strategic Software Technology, "DC-WebShare," Data Connection Ltd, 1998-2000, http://web.archive.org/web/20001016115016/www.dataconnection.com/conf/webshare.htm, Submitted on Nov. 24, 2003.

Data Connection, Strategic Computer Technology, "DC-Recorder," Data Connection Ltd, 1998-2000, http://web.archive.org/web/20001016055611/www.dataconnection.com/conf/recorder.htm, Submitted on Nov. 24, 2003.

Data Connection, Strategic Software Technology, "DC-MeetingServer," Data Connection Ltd, 1998-2000, http://web.archive.org/web/20000914200719/www.dataconnection.com/conf/meetingserver.htm, Submitted on Nov. 24, 2003.

Data Connection, Strategic Computer Technology, "DC-MeetingServer," Data Connection Ltd, 1998-2000, http://web.archive.org/web/20021201144529/www.dataconnection.com/inetapps/conferencing.htm, Submitted on Nov. 24, 2003.

Data Connection, Strategic Software Technology, "DC-VoiceNet Features," Data Connection Ltd, 1998-2000, http://web.archive.org/web/20001016102614/www.dataconnection.com/messging/vnfeat.htm, Submitted on Nov. 24, 2003.

Data Connection, Strategic Software Technology, "DC-VoiceNet," Data Connection Ltd, 1998-2000, http:/web.archive.org/web/20000914200424/www.dataconnection.com/messging/vnet.htm Submitted on Nov. 24, 2003.

Data Connection, Strategic Computer Technology, "Messaging Software Products and Services," Data Connection Ltd, 1998-2000, http://web.archive.org/web/20010305143803/www.dataconnection.com/messging/messgidx.htm, Submitted on Nov. 24, 2003.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm, Submitted on Nov. 24, 2003.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004, Submitted on Nov. 24, 2003.

Data Connection, "Integrating Voicemail Systems, A white paper describing the integration of heterogeneous voicemail systems," Michael James, Internet Applications Group, Data Connection Ltd., 2004, Submitted on Nov. 24, 2003.

Data Connection, Strategic Computer Technology, "MailNGen: Next generation messaging for Service Providers," Data Connection Ltd, 1998-2004, http://www.dataconnection.com/messaging/, Submitted on Nov. 24, 2003.

Data Connection, Strategic Computer Technology, "MailNGen: Unified Messaging," Data Connection Ltd, 1998-2004, http://www.dataconnection.com/messaging/unified_messaging.htm, Submitted on Nov. 24, 2003.

Data Connection, Strategic Computer Technology, "MeetingServer: The award-winning web conferencing solution for Service Providers," Data Connection Ltd, 1998-2005, http://www.dataconnection.com/conferencing/, Submitted on Nov. 24, 2003.

Data Connection, Strategic Computer Technology, "MeetingServer: The web conferencing solution for Service Providers," Data Connection Ltd, 1998-2004, http://www.dataconnection.com/conferencing/meetingserver.htm, Submitted on Nov. 24, 2003.

Data Connection, Strategic Computer Technology, "MeetingServer: Web conferencing architecture," Data Connection Ltd, 1998-2004, http://www.dataconnection.com/conferencinq/meetingserver_arch.htm, Submitted on Nov. 24, 2003.

"Calendar Scheduling Teleconference Communication Mechanism," IBM Technical Disclosure Bulletin, IBM Corp. New York, US, vol. 37, No. 3, Mar. 1, 1994, p. 561.

White, "How Computers Work," Millenium Edition, Sep. 1999, Que Corporation, pp. vi-xi, 135-184, 399-421.

Derfler et al., "How Networks Work," Bestseller Edition, 1996, Ziff-Davis Press, pp. vi-ix, 1-3, 21-70, 190-198.

Gralla, "How the Internet Works," Ziff-Davis Press, 1999, pp. vi-xi, 2-3, 8-11, 308-324.

Muller, "Desktop Encyclopedia of the Internet," Artech House Inc., 1999, pp. v-xiv, 233-246, 539-559.

http://replay.waybackmachine.org/20020207142936/http://www.clicktocall.com/main.htm, Internet archive of website "www.clicktocall.com", dated Feb. 7, 2002.

Gaedke, et al., "Web Content Delivery to Heterogeneous Mobile Platforms", http://citeseer.ist.psu.edu/viewdoc/summary?doi=10 . 1.1.33.4361, 1998, 1-14.

Gessler, et al., "PDAs as mobile WWW browers", http://citeseer.ist.psu.edu/viewdoc/summary?doi=1 0.1.1.48.9198, 1995, 1-12.

Kunz, et al., "An Architecture for Adaptive Mobile Applications", http://citeseer.ist.psu.edu/viewdoc/summary?doi=1 0.1.1.40.624, 1999, 1-15.

Lauff, et al., "Multimedia Client Implementation on Personal Digital Assistants", http://citeseer.ist.psu.edu/viewdoc/summary?doi=1 0.1. 16.6059, 1997, 1-15.

* cited by examiner

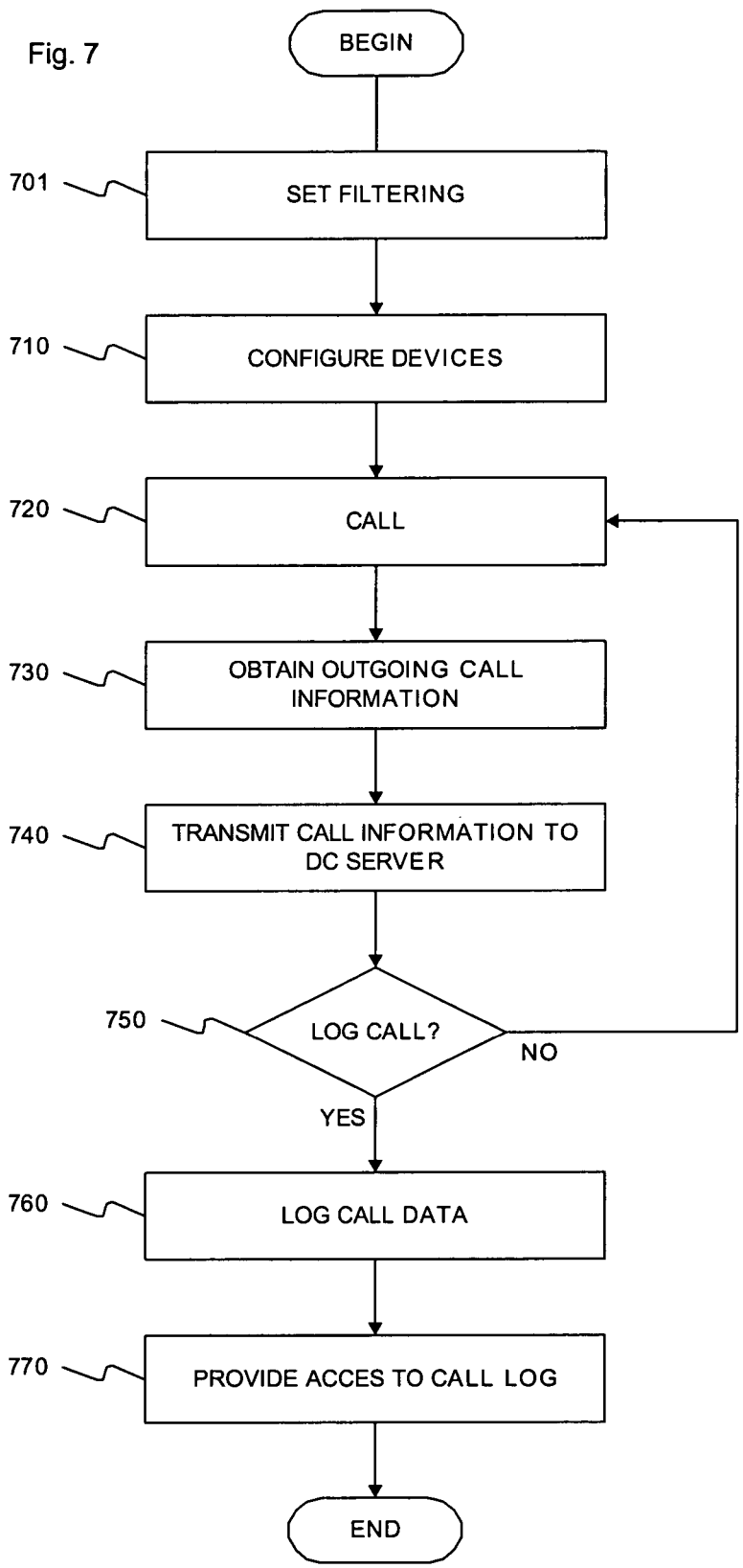

METHODS AND SYSTEMS FOR A CALL LOG

RELATED APPLICATIONS

This application is a continuation-in-part of U.S. patent application Ser. No. 10/083,793, entitled "METHOD AND APPARATUS FOR CALENDARED COMMUNICATIONS FLOW CONTROL," filed Feb. 27, 2002, U.S. patent application Ser. No. 10/083,792, entitled "VOICE MAIL INTEGRATION WITH INSTANT MESSENGER," filed Feb. 27, 2002, now U.S. Pat. No. 7,142,646; U.S. patent application Ser. No. 10/083,884, entitled "DEVICE INDEPENDENT CALLER ID," filed Feb. 27, 2002, now U.S. Pat. No. 7,190,773; and U.S. patent application Ser. No. 10/083,822, entitled "METHOD AND APPARATUS FOR A UNIFIED COMMUNICATION MANAGEMENT VIA INSTANT MESSAGING," filed Feb. 27, 2002, now abandoned, all of which claim priority to U.S. Provisional Patent Application Nos. 60/272,122, filed Feb. 27, 2001, 60/272,167, filed Feb. 27, 2001, 60/275,667, filed Mar. 13, 2001, 60/275,719, filed Mar. 13, 2001, 60/275,020, filed Mar. 13, 2001, 60/275,031, filed Mar. 13, 2001, and 60/276,505, filed Mar. 19, 2001, and all of which are expressly incorporated herein by reference in their entirety.

Applicants claim the right to priority under 35 U.S.C. §119(e) based on Provisional Patent Application No. 60/428,704, entitled "DIGITAL COMPANION," filed Nov. 25, 2002; and Provisional Patent Application No. 60/436,018, entitled "DIGITAL COMPANION," filed Dec. 26, 2002, both of which are expressly incorporated herein by reference in their entirety.

The present application also relates to U.S. patent application Ser. No. 10/084,121, entitled "CALENDAR-BASED CALLING AGENTS," filed Feb. 27, 2002, U.S. patent application Ser. No. 10/720,661, entitled "METHODS AND SYSTEMS FOR CONFIGURING AND PROVIDING CONFERENCE CALLS." U.S. patent application Ser. No. 10/720,859, now U.S. Pat. No. 7,418,090, issued Aug. 26, 2008, entitled "METHODS AND SYSTEMS FOR CONFERENCE CALL BUFFERING," U.S. patent application Ser. No. 10/721,009, entitled "METHODS AND SYSTEMS FOR COMPUTER ENHANCED CONFERENCE CALLING," U.S. patent application Ser. No. 10/720,943, entitled "METHODS AND SYSTEMS FOR REMOTE CALL ESTABLISHMENT," U.S. patent application Ser. No. 10/721,005, entitled "METHODS AND SYSTEMS FOR CALL MANAGEMENT WITH USER INTERVENTION," U.S. patent application Ser. No. 10/720,868, entitled "METHODS AND SYSTEMS FOR DIRECTORY INFORMATION LOOKUP," U.S. patent application Ser. No. 10/720,970, entitled "METHODS AND SYSTEMS FOR AUTOMATIC COMMUNICATION LINE MANAGEMENT BASED ON DEVICE LOCATION." U.S. patent application Ser. No. 10/720,952, entitled "METHOD AND APPARATUS FOR ADAPTIVE MESSAGE AND CALL NOTIFICATION." U.S. patent application Ser. No. 10/720,633, entitled "METHODS AND SYSTEMS FOR AUTOMATIC FORWARDING OF COMMUNICATIONS TO A PREFERRED DEVICE." U.S. patent application Ser. No. 10/720,971, entitled "METHODS AND SYSTEMS FOR LINE MANAGEMENT." U.S. patent application Ser. No. 10/720,784, entitled "METHODS AND SYSTEMS FOR CONTACT MANAGEMENT," U.S. patent application Ser. No. 10/720,920, entitled "METHODS AND SYSTEMS FOR NOTIFICATION OF CALL TO DEVICE." U.S. patent application Ser. No. 10/720,825, entitled "METHODS AND SYSTEMS FOR SINGLE NUMBER TEXT MESSAGING," U.S. patent application Ser. No. 10/720,944, entitled "METHODS AND SYSTEMS FOR MULTI-USER SELECTIVE NOTIFICATION," U.S. patent application Ser. No. 10/720,933, entitled "METHODS AND SYSTEMS FOR CPN TRIGGERED COLLABORATION," and U.S. patent application Ser. No. 10/720,938, entitled "METHODS AND SYSTEMS FOR PREEMPTIVE REJECTION OF CALLS," all of which are expressly incorporated herein by reference in their entirety.

TECHNICAL FIELD

The present invention generally relates to communication systems and, more specifically, to methods and systems for logging and managing outgoing call information.

BACKGROUND

A wide variety of means exist for communication between users. For example, a user may conduct phone calls via a home phone, work phone, and mobile phone. In addition, users may also communicate using devices such as PC's, PDA's, pagers, etc. using, for example, email and instant messaging.

Unfortunately, managing such a wide variety of communication means can be difficult. In particular, as a user changes location, communication with the user may vary. For example, while on travel, it may only be possible to reach a user by mobile phone. However, the user may best be reached by email while at work. Also, the user may wish to implement various rules for receiving and controlling communications. For example, to be reached at home, the user may want the home phone to ring three times before forwarding the call to a mobile phone. As another example, the user may wish to be paged each time an email is received from a particular person while away from the office.

Typically, to implement communication management, a person must individually manage each communication device separately. Thus, when the user wishes to change how communication is managed, the user may have to deal with numerous devices and, perhaps, service centers.

Further, call management is becoming increasingly difficult given the variety of communication devices and services. Especially with outgoing calls, conventional communication system provide users with limited features. One feature often provided by conventional systems is "redial," which enables a user to initiate a call to a previously dialed number without re-inputting that number. Certain systems (e.g., digital cell phones) allow users to locally store phone numbers in a contact list, which is usually a FIFO or rolling list with limited storage capacity. In such systems, the user typically must perform an action to insert phone numbers in the contact list. For example, in a cell phone, the user must enter in phone numbers via a keypad and instruct the device to save the entered numbers. Certain systems may automatically store all outgoing and incoming calls in a rolling list as they are dialed and received; however, such systems typically provide limited FIFO storage and usually store only the numbers. Current communication systems do not provide users with filtering and exclusion options for outgoing call storage, and these systems do not allow users to obtain caller information from the dialed numbers. Moreover, conventional systems do not facilitate coordination and management of outgoing calls originating from several devices (e.g., cell phones, laptops, PDAs, J2ME phones, BREW phones, etc.).

Methods, systems, and articles of manufacture consistent with certain embodiments of the present invention are directed to obviating one or more of the issues set forth above.

SUMMARY

Systems and methods consistent with the present invention may log information associated with outgoing calls in a call log. In one embodiment of the present invention, systems and methods may be provided for receiving instructions from a user that specify filtering preferences for logging outgoing calls. For example, a user may specify a list of telephone numbers that, when dialed, should be excluded from or included in the call log. In one embodiment, the user may specify filter settings via a user terminal coupled to a server. Methods and systems consistent with the present invention may obtain outgoing call information associated with a call originating from a calling device and destined to a called device. For example, a programmable wireless telephone may be configured to capture outgoing call information (e.g., a dialed telephone number). In another example, outgoing call information may be obtained via a service control point associated with a landline telephone. Consistent with principles of the present invention, outgoing call information may be transmitted to a server residing in a service center. Systems and methods consistent with the present invention may determine whether or not to log the outgoing call information based on the filter settings (e.g., the server may consult the exclusion list). If an outgoing call passes through filtering, the outgoing call information may be stored in a call log, which may, in certain implementations, reside in a database in the service center. Systems and methods consistent with the present invention may provide the user with access to the call log (e.g., via the user terminal).

In certain embodiments consistent with the present invention, systems and methods may use the call log to add contacts to a contact list. Consistent with principles of the present invention, contact-related information associated with a called party may be retrieved using the call log. For example, a server in the service center may retrieve contact-related information using the dialed number. The retrieved contact information may then be added to the contact list.

In certain embodiments consistent with the present invention, systems and methods may perform data analyses using the call log. For example, calling patterns and/or frequencies may be processed via information in the call log and presented to the user.

In certain embodiments consistent with the present invention, systems and methods may log and manage calls associated with a plurality of devices. Methods and systems may obtain information associated with outgoing calls originating from each of a plurality of source communication devices and destined to one or more destination devices. For example, information associated with outbound calls originating from a user's cell phone, landline phone, and PDA may be obtained. Methods and systems consistent with the present invention may store the outgoing call information associated with each of a user's devices in a call log. In certain embodiments, users may set filtering settings for each device, and outgoing calls from each device may be stored in the call log based on the filtering settings. The call log may be accessible by the user terminal and/or one or more of the devices.

Both the foregoing and the following descriptions are exemplary and explanatory only and are not intended to limit the claimed invention in any manner whatsoever.

BRIEF DESCRIPTION OF THE DRAWINGS

The accompanying drawings, which are incorporated in and constitute a part of this specification, illustrate exemplary embodiments of the invention and, together with the description, serve to explain principles of the invention. In the drawings:

FIG. 7 is a flowchart depicting stages of a method consistent with certain embodiments of the present invention.

DETAILED DESCRIPTION

Reference will now be made in detail to exemplary embodiments of the present invention, examples of which are illustrated in the accompanying drawings. Wherever possible, the same reference numbers will be used throughout the figures to refer to the same or like elements. The accompanying figures illustrate exemplary embodiments and implementations consistent with the present invention, but the description of those embodiments does not indicate or imply that other embodiments or implementations do not fall within the scope of present invention. It is to be understood that other implementations may be utilized and that structural and method changes may be made without departing from the scope of present invention.

Figure 1:
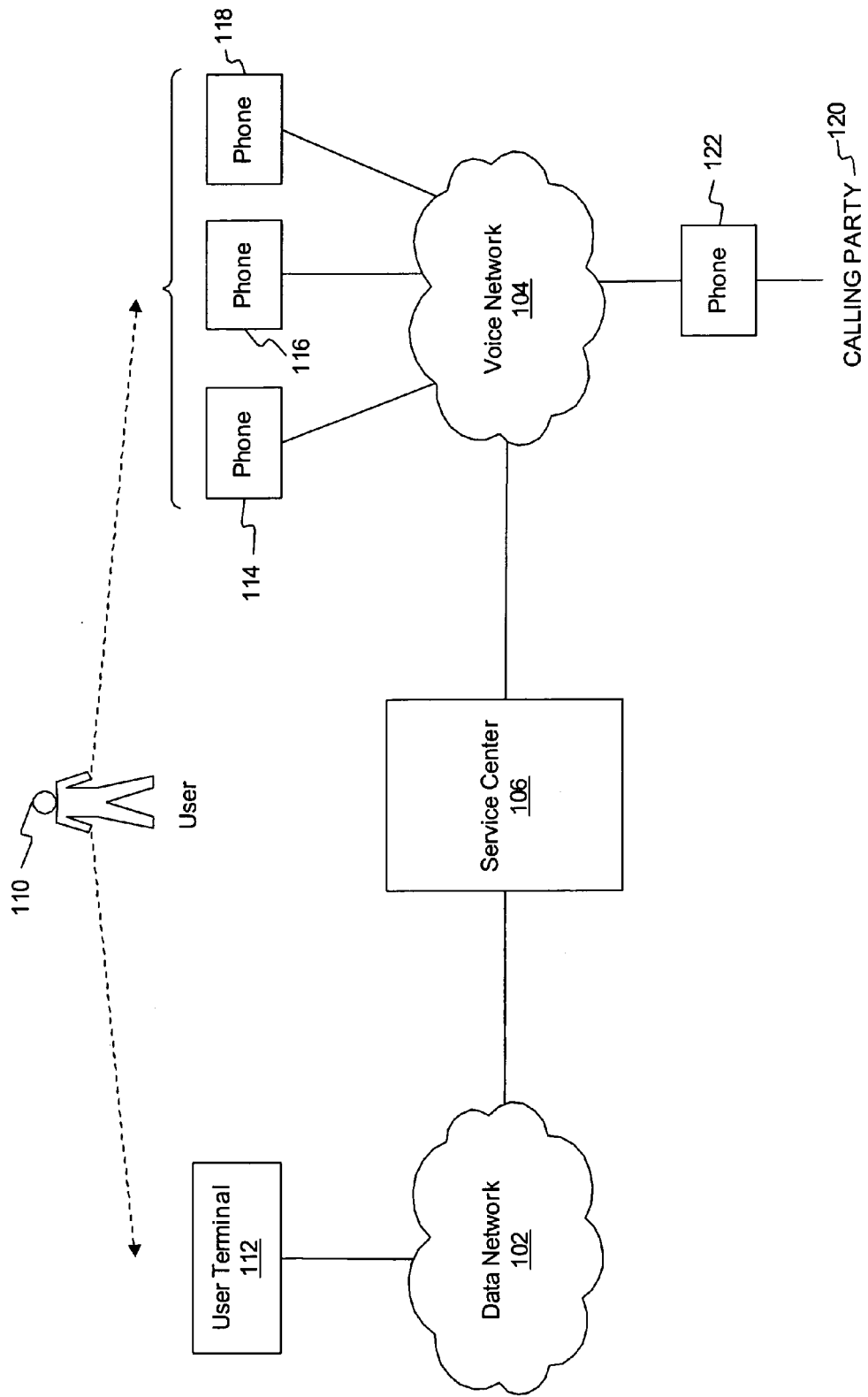
FIG. 1 is a diagram of an exemplary data processing and telecommunications environment in which features and aspects consistent with the principals of the present invention may be implemented.

FIG. 1 is a block diagram of a data processing and telecommunications environment 100, in which features and aspects consistent with the present invention may be implemented. The number of components in environment 100 is not limited to what is shown and other variations in the number of arrangements of components are possible, consistent with embodiments of the invention. The components of FIG. 1 may be implemented through hardware, software, and/or firmware. Data processing and telecommunications environment 100 may include a data network 102, a voice network 104, and a service center 106. A user 110 may use a user terminal 112 to interface with data network 102 and may use phones 114, 116, and 118 to interface with voice network 104. Calling party 120 may use phone 122 to call a user, such as user 110, at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. Data network 102 may be implemented through any suitable combination of wired and/or wireless communication networks. By way of example, data network 102 may be implemented through a wide area network (WAN), local area network (LAN), an intranet and/or the Internet. Further, the service center 106 may be connected to multiple data networks 102, such as, for example, to a wireless carrier network and to the Internet.

Voice network 104 may provide telephony services to allow a calling party, such as calling party 120, to place a telephone call to user 110. In one embodiment, voice network 104 may be implemented using a network, such as the Public Switched Telephone Network ("PSTN"). Alternatively, voice network 104 may be implemented using voice-over Internet Protocol ("VoIP") technology. In addition, voice network 104 may be implemented using both PSTN and VoIP technology consistent with the principles of the present invention. Further, service center 106 may be connected to multiple voice networks 104, such as for example, Verizon's™ Voice Network, voice networks operated by other carriers, and wireless carrier networks.

Service center 106 provides a platform for managing communications over data network 102 and voice network 104. Service center 106 also provides gateway functions, such as code and protocol conversions, to transfer communications between data network 102 and voice network 104. Service center 106 may be implemented using a combination of hardware, software, and/or firmware. For example, service center 106 may be implemented using a plurality of general purpose computers or servers coupled by a network (not shown). Although service center 106 is shown with direct connections to data network 102 and voice network 104, any number and type of network elements may be interposed between service center 106, data network 102, and voice network 104.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. In addition, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

Furthermore, user terminal 112 may communicate directly with service center 106. For example, a client application may be installed on user terminal 112, which directly communicates with service center 106. Also, user terminal 112 may communicate with service center 106 via a proxy.

Phones 114, 116, 118, and 122 interface with voice network 104. Phones 114, 116, 118, and 122 may be implemented using known devices, including wireline phones and mobile phones. In certain embodiments of the present invention, phones 114, 116, 118, and 122 may include programmable calling devices such as BREW phones, J2ME phones, PDAs, and laptops and may be compatible with PSTN and/or VoIP technology. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
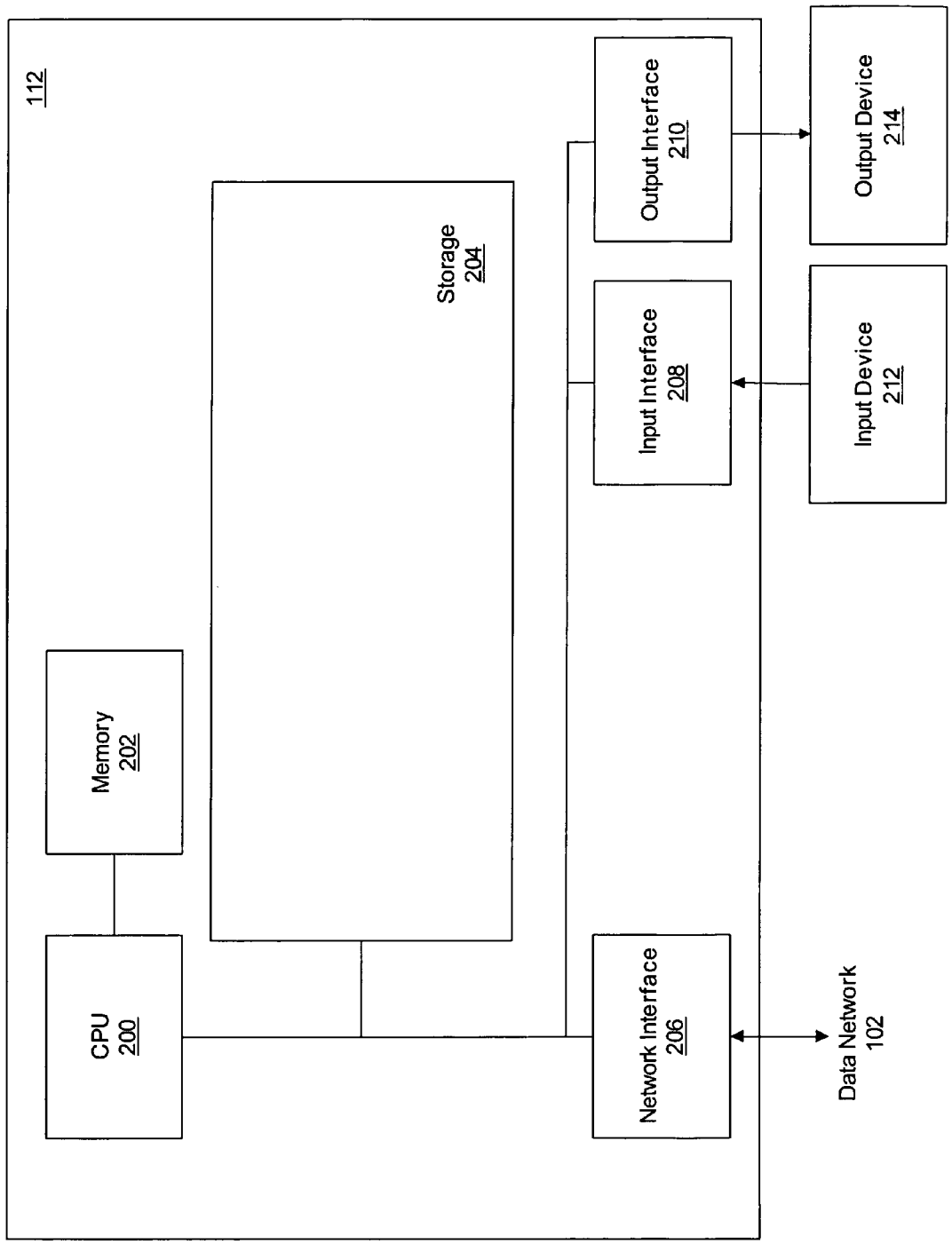
FIG. 2 is a diagram of an exemplary user terminal, consistent with the principals of the present invention.

FIG. 2 is a block diagram of user terminal 112 consistent with the present invention. User terminal 112 includes a central processing unit (CPU) 200, a memory 202, a storage module 204, a network interface 206, an input interface 208, an output interface 210, an input device 216, and an output device 218.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. CPU 200 may be implemented, for example, using a Pentium™ processor provided from Intel Corporation.

Memory 202 provides a primary memory for CPU 200, such as for program code. Memory 202 may be embodied with a variety of components of subsystems, including a random access memory ("RAM") and a read-only memory ("ROM"). When user terminal 112 executes an application installed in storage module 204, CPU 200 may download at least a portion of the program code from storage module 204 into memory 202. As CPU 200 executes the program code, CPU 200 may also retrieve additional portions of program code from storage module 204.

Storage module 204 may provide mass storage for user terminal 112. Storage module 204 may be implemented with a variety of components or subsystems including, for example, a hard drive, an optical drive, CD ROM drive, DVD drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 may include, for example, program code for a calendar application, such as GroupWise provided by Novell Corporation or Outlook provided by Microsoft Corporation; a client application, such as a Microsoft Network Messenger Service (MSNMS) client or America Online Instant Messenger (AIM) client; and an Operating System (OS), such as the Windows Operation System provided by Microsoft Corporation. In addition, storage module 204 may include other program code and information, such as program code for TCP/IP communications; kernel and device drivers; configuration information, such as a Dynamic Host Configuration Protocol (DHCP) configuration; a web browser, such as Internet Explorer provided by Microsoft Corporation, or Netscape Communicator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3:
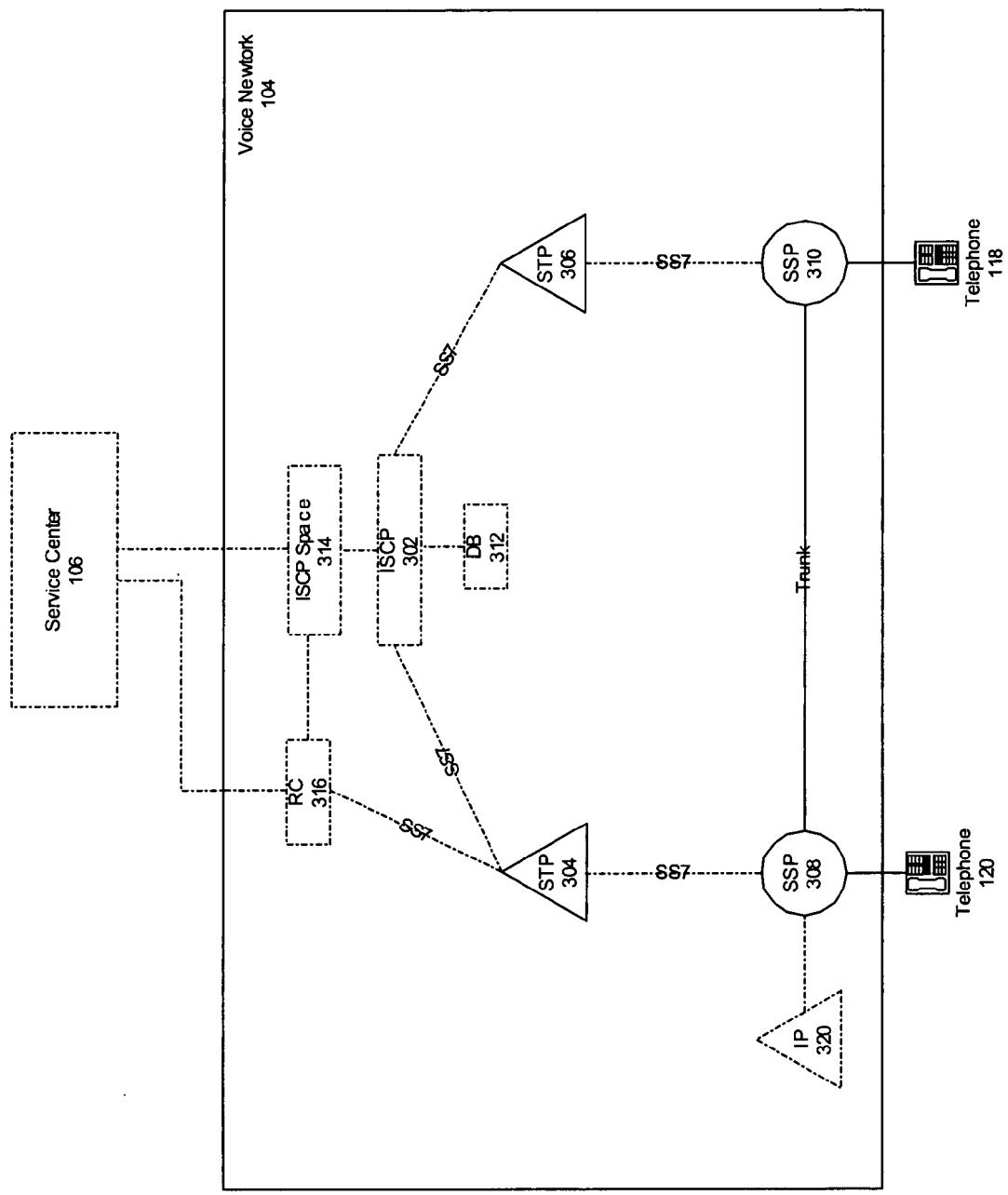
FIG. 3 is a diagram of a voice network, consistent with the principles of the present invention.

FIG. 3 is a diagram of a voice network, consistent with the principles of the present invention. As shown, voice network 104 includes an intelligent service control point (ISCP) 302, service transfer points (STP) 304 and 306, service switching points (SSP) 308 and 310, a line information database (LIDB) 312, an ISCP Service Provisioning And Creation Environment (SPACE) 314, a Recent Change Environment 316, and an Intelligent Peripheral (IP) 320.

Voice network 104 may be implemented using the PSTN and SS7 as a signaling protocol. The SS7 protocol allows voice network 104 to provide features, such as call forwarding, caller-ID, three-way calling, wireless services such as roaming and mobile subscriber authentication, local number portability, and toll-free/toll services. The SS7 protocol provides various types of messages to support the features of voice network 104. For example, these SS7 messages may include Transaction Capabilities Applications Part ("TCAP") messages to support event "triggers," and queries and responses between ISCP 302 and SSPs 308 and 310.

ISCP 302 may also be, for example, a standard service control point (SCP) or an Advanced Intelligent Network (AIN) SCP. ISCP 302 provides translation and routing services of SS7 messages to support the features of voice network 104, such as call forwarding. In addition, ISCP 302 may exchange information with the service center 106 using TCP/IP or SS7. ISCP 302 may be implemented using a combination of known hardware and software. Although ISCP 302 is shown with a direct connection to service center 106 through ISCP SPACE 314, any number of network elements including routers, switches, hubs, etc., may be used to connect ISCP 302 and service center 106.

STPs 304 and 306 relay SS7 messages within voice network 104. For example, STP 304 may route SS7 messages between SSPs 308 and 310. STP 302 may be implemented using known hardware and software from manufacturers such as NORTEL™ and LUCENT Technologies™.

SSPs 308 and 310 provide an interface between voice network 104 and phones 114 and 120, respectively, to setup, manage, and release telephone calls within voice network 104. SSPs 308 and 310 may be implemented as a voice switch, an SS7 switch, or a computer connected to a switch. SSPs 308 and 310 exchange SS7 signal units to support a telephone call between calling party 120 and user 110. For example, SSPs 308 and 310 may exchange SS7 messages, such as TCAP messages, within message signal units ("MSU") to control calls, perform database queries to configuration database 312, and provide maintenance information.

Line Information Database (LIDB) 312 comprises one or more known databases to support the features of voice network 104. For example, LIDB 312 may include subscriber information, such as a service profile, name and address, and credit card validation information.

ISCP Service Provisioning and Creation Environment (SPACE) 314 may be included as part of ISCP 302 or be separate from ISCP 302. For example, the Telcordia™ ISCP may include an environment similar to SPACE 314 as part of the product. Further, ISCP SPACE 314 may include one or more servers. ISCP SPACE 314 is the point in the ISCP platform where customer record updates may be made.

In one embodiment, customer records may be stored in ISCP SPACE 314 such that the records may be updated and sent to ISCP 302. These records may include information regarding how to handle calls directed to the customer. For example, these customer records may include information regarding whether or not calls for the customer are to be forwarded to a different number, and/or whether or not the call should be directed to an IP, such as a voice mail system, after a certain number of rings. Additionally, one ISCP SPACE 314 may provide updates to one or more ISCPs 302 via an ISCP network (not shown).

Additionally, voice network 104 may include one or more recent change engines 316 such as, for example, an Enterprise Recent Change engine (eRC); an Assignment, Activation, and Inventory System (MIS); or a multi-services platform (MSP). As an example, the eRC and MIS may be used in voice networks 104 located in the western part of the United States, while an MSP may be used in networks in the eastern part.

The recent change engines may be used to update switch and ISCP databases. For example, a recent change engine may deliver database updates to SSPs and to ISCPs, such that when updating databases, these recent change engines emulate human operators. Additionally, if the instructions are to be sent to an ISCP 302, the recent change engine may first send the instructions to ISCP SPACE 314, which then propagates the instructions to ISCP 302 as discussed above. Further, an MSP may be used, for example, for providing updates to both SSPs 308 or 310 and ISCPs 302. Or, for example, an eRC may be used for providing updates to SSPs 308 or 310, while an MIS is used for providing updates to ISCPs 302.

Additionally, voice network 104 may include one or more intelligent peripherals (IP). For example, in FIG. 4, an IP 320 is illustrated as being connected to SSP 308. These IPs may be used for providing services, such as voice mail services.

Figure 4:
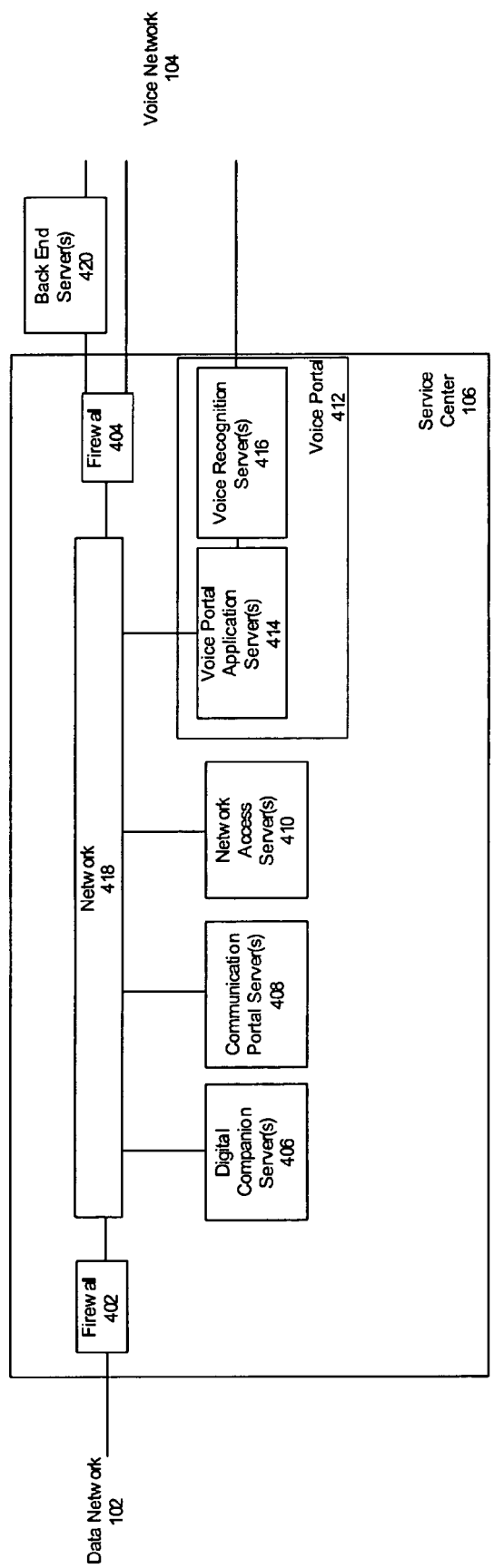
FIG. 4 is a block diagram of a service center, consistent with the principles of the present invention.

FIG. 4 is a block diagram of a service center, consistent with the principles of the present invention. As shown, service center 106 may include firewalls 402 and 404, one or more digital companion servers 406, one or more communication portal servers 408, one or more network access servers 410, and a voice portal 412. Voice portal 412 may include a voice portal application server 414 and a voice recognition server 416. A network 418 may be used to interconnect the firewalls and servers. Additionally, back end server(s) 420 may be provided between service center 106 and voice network 104.

Firewalls 402 and 404 provide security services for communications between service center 106, data network 102, and voice network 104, respectively. For example, firewalls 402 and 404 may restrict communications between user terminal 112 and one or more servers within service center 106. Any security policy may be implemented in firewalls 402 and 404 consistent with the principles of the present invention. Firewalls 402 and 404 may be implemented using a combination of known hardware and software, such as the Raptor Firewall provided by the Axent Corporation. Further, firewalls 402 and 404 may be implemented as separate machines within service center 106, or implemented on one or more machines external to service center 106.

Network 418 may be any type of network, such as an Ethernet or FDDI network. Additionally, network 418 may also include switches and routers as appropriate without departing from the scope of the invention. Further, additional firewalls may be present in network 418, for example, to place one or more of servers 406, 408, 410, or voice portal 412 behind additional firewalls.

Each server (406, 408, 410, 414, 416, 420) may be any type of server or computer, such as a Unix or DOS based server or computer. The servers may implement various logical functions, such as those described below. In FIG. 4, a different server is illustrated as being used for each logical function. In other embodiments, the logical functions may be split across multiple servers, multiple servers may be used to implement a single function, all functions may be performed by a single server, etc.

In general, a digital companion server 406 may provide the software and hardware for providing specific services of the service center. Exemplary services include, for example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, etc. Consistent with principles of the present invention, digital companion server 406 may log and perform operations on outgoing call information associated with a particular subscriber (i.e., user 110). Outgoing call information may be logged/recorded from any of user 110's devices (e.g., 114, 116, 118).

A communication portal server 408 may provide the hardware and software for managing a customer's account and interfacing with customer account information stored by the provider of customer's voice network 104. Network access servers 410 may provide the hardware and software for sending and receiving information to voice network 104 in processing the applications provided by the service center. For example, network access servers 410 may be used for transmitting and/or receiving information from/to an ISCP 302 or an SSP 308 or 310 of voice network 104.

Voice portal 412 includes software and hardware for receiving and processing instructions from a customer via voice. For example, a customer may dial a specific number for voice portal 412. Then the customer using speech may instruct service center 106 to modify the services to which the customer subscribes. Voice portal 412 may include, for example, a voice recognition function 416 and an application function 414. Voice recognition function 416 may receive and interpret dictation, or recognize spoken commands. Application function 414 may take, for example, the output from voice recognition function 416, convert it to a format suitable for service center 106 and forward the information to one or more servers (406, 408, 410) in service center 106.

Figure 5:
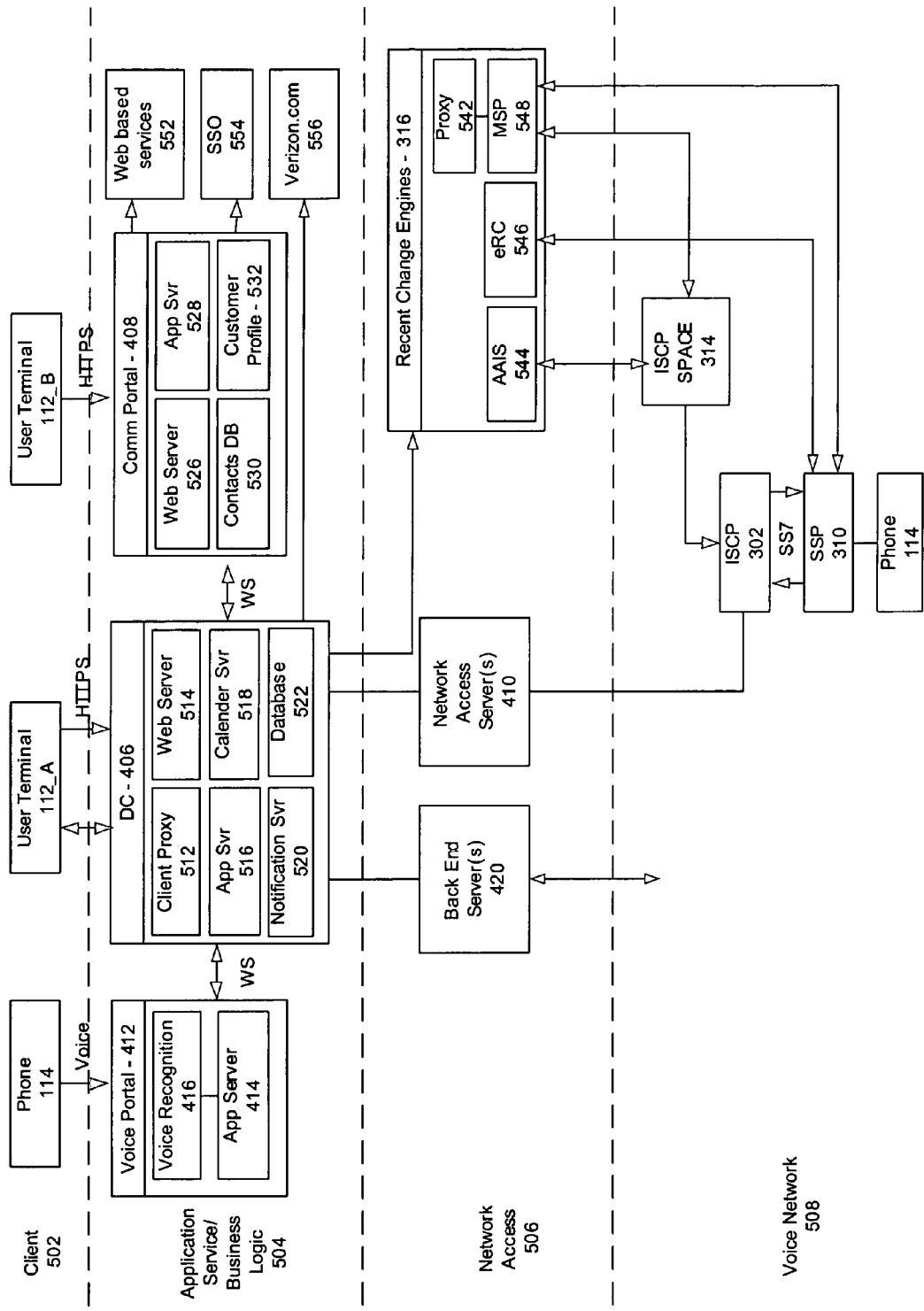
FIG. 5 illustrates a logical architecture of an exemplary system, consistent with the present invention.

FIG. 5 illustrates a logical architecture of an exemplary system, consistent with the present invention. As illustrated, the logical architecture may be split into four planes: client side plane 502, application service plane 504, network access plane 506, and voice network plane 508.

Client side plane 502 includes the user terminals 112_A and 112_B that a user may use to send and/or receive information to/from the service center 106. Additionally, client side 502 includes the user's phone(s) 114. As discussed above, user terminals 112 may be any type of device a user may use for communicating with Service Center 106. For example, user terminal 112_A may be a PDA running a program for communicating with Service Center 106, while user terminal 112_B may be a desktop type computer running a web browser for communicating with Service Center 106 via the Internet. Additionally, the user may have one or more phones 114, such as, for example, one or more standard landline telephones and/or wireless phones.

Application service plane 504 includes digital companion server(s) 406, communication portal server(s) 408, and voice portal 412. These entities may communicate between one another using, for example, web services or any other suitable protocols. Web services are a standardized way of integrating Web-based applications using the Extensible Markup Language (XML), Simple Object Access Protocol (SOAP), Web Services Description Language (WSDL) and Universal Description, Discovery and Integration (UDDI) open standards over an Internet protocol (IP) backbone.

As illustrated, a digital companion server 406 may provide the following functions: a client proxy 512, a web server 514, an application server function 516, a calendar server function 518, a notification server function 520, and a database function 522. Each of these functions may be performed in hardware, software, and/or firmware. Further, these functions may each be executed by a separate server, split across multiple servers, included on the same server functions, or any other manner.

Client proxy function 512 provides a proxy function for the digital companion that may be used for security purposes. This client proxy function 512 may be included in a separate server such that all communications sent from the other digital companion functions/servers to a user terminal 112 via data network 102 go through client proxy 512. Also, if client proxy 512 is included on a separate server, for example, an additional firewall may be provided between the client proxy 512 and the other digital companion servers to provide additional security.

Web server 514 provides functionality for receiving traffic over data network 102 from a customer. For example, web server 514 may be a standard web server that a customer may access using a web browser program, such as Internet Explorer or Netscape Communicator.

Application server function 516 encompasses the general functions performed by digital companion server(s) 406. For example, these functions may include interfacing with the various other digital companion functions to perform specific applications provided by the service center. These services may include, for example, interfacing with other function(s), software, and/or hardware to provide a customer with the capability of managing their calls online. For example, permitting a customer to add contacts to their address book from a history of calls made or received by the customer, permitting a customer to make calls directly from their address book, scheduling a call to be placed at a specific time, or permitting the customer to look at the name and/or address associated with a phone number. Additionally, these services may include permitting the customer to listen to their voice mail on-line, forwarding their calls based on a scheduler and/or the calling parties number, setting up conference calls on-line, etc. Consistent with principles of the present invention, application server function 516 may facilitate logging and processing outgoing call information associated with a particular subscriber. Application server function 516 may log/record outgoing call information from any of a particular user 110's devices (e.g., 114, 116, 118). Application server function 516 may store the outgoing call information, display the information to a subscriber (110), and perform various operations on the information.

Additionally, application server function 516 may interface with one or more external devices, such as an external web server, for retrieving or sending information. For example, application server function 516 may interface with a voice network's data center 556 (e.g., verizon.com) to determine the services to which the customer subscribes (e.g., call waiting, call forwarding, voice mail, etc.).

Calendar server function 518 may provide the capability of scheduling events, logging when certain events occurred, triggering the application-functions to perform a function at a particular time, etc.

Notification server function 520 provides the capability to send information from service center 106 to a user terminal 112. For example, notification server function 520 at the direction of application server function 516 may send a notification to user terminal 112 that the user is presently receiving a phone call at user's phone 114.

Database function 522 provides the storage of information useable by the various applications executed by the digital companion servers. These databases may be included in, for example, one or more external storage devices connected to the digital companion servers. Alternatively, the databases may be included in storage devices within the digital companion servers themselves. The storage devices providing database function 522 may be any type of storage device, such as for example, CD-ROMs, DVD's, disk drives, magnetic tape, etc.

As discussed above, communication portal server(s) 408 provide the hardware and software for managing a customer's account and interfacing with customer account information stored by the provider of customer's voice network 104. As illustrated in FIG. 5, a communication portal server 408 may provide the following functions: a web server function 526, an application server function 528, a contacts database function 530, and/or a customer profile function 532. Each of these functions may be performed by a separate server, split across multiple servers, included on the same server functions, or any other manner.

Web server function 526, as with web server function 522 of the digital companion servers, provides functionality for receiving traffic over data network 102 from a customer. For example, the web server may be a standard web server that a customer may access using a web browser, such as Internet Explorer or Netscape Communicator.

Application server function 528 encompasses the general functions performed by communication portal servers 406. For example, these functions may include interfacing with the voice network to retrieve and/or modify customer profile information, and creating and editing an address book for the user. Additionally, application server function 528 may include the functionality of sending and/or receiving information to/from external servers and/or devices. For example, communication portal servers 408 may be connected to a network, such as, the Internet. Application server function 528 may then provide connectivity over the Internet to external servers 552 that provide web services, such as the Superpages webpage. Application function 528 could then contact these external services 552 to retrieve information, such as an address for a person in the user's address book.

In another example, application server function 528 of communication portal 408 may interface a single sign on (SSO) server 554. SSO 554 may be used to allow users to access all services to which the user subscribes, on the basis of a single authentication that is performed when they initially access the network.

Contacts database 530 includes storage devices for storing an address book for the user. This address book may be any type of address book. For example, the user's address book may include the names, phone numbers, and addresses of people and/or organizations. These storage devices may be internal or external to communication portal servers 406 or some combination in between. In addition, these storage devices may be any type of storage device, such as magnetic storage, memory storage, etc.

Customer profile database 532 includes storage devices for storing customer profile information for the user. These storage devices may be the same or separate storage devices used for the contacts database. The customer profile may include information regarding the user's account for their voice network. For example, this information may include the user's name, billing address, and other account information. Additionally, the customer profile may include information regarding voice services to which the user subscribes, such as, for example, call waiting, voice mail, etc.

Additionally, application services plane 504 of the architecture may include a voice portal 412. As discussed above, voice portal 412 may include, for example, a voice recognition function 416 and an application server function 414, and be used for receiving and processing instructions from a customer via voice. The voice recognition function may be implemented using hardware and/or software capable of providing voice recognition capabilities. This hardware and/or software may be a commercially available product, such as the Voice Application platform available from Tellme Networks, Incorporated. Application server function 414 of voice portal 412 may include hardware and/or software for exchanging information between digital companion servers 406 and voice recognition function 416. Additionally, application server function 414 may be included on a separate server, included in the hardware and software providing voice recognition function 416, included in digital companion servers 406, etc.

Network Access plane 506 of the architecture includes the functions for providing connectivity between application service plane 502 and voice network 104. For example, this plane may include the recent change engines 316, network access servers 410, and/or back end servers 420.

As discussed above, recent change engines 316 may be used to update switches and ISCP databases included in voice network 104. In one embodiment, recent change engines 316 may include an AAIS 544, an eRC 546, and/or an MSP 548. Additionally, a proxy 542 may be used between digital companion servers 406 and recent change engines 542 for security purposes.

Network access servers 410 may be included in the service center 106 and may provide the hardware and software for sending and receiving information to voice network 410 in processing the applications provided by the service center. For example, network access servers 410 may include a Caller ID (CID) functionality for retrieving caller ID information from voice network 104, a click to dial (CTD) functionality for instructing an intelligent peripheral (IP) in the voice network to place a call via an SSP, and/or a real time call management (RTCM) functionality for interfacing with an ISCP of the voice network.

Network Access plane 506 may also include one or more back end server(s) 420. These back end server(s) 420 may include hardware and/or software for interfacing service center 106 and voice network 104. Back end server(s) 420 may be connected to service center 106 by a network, by a direct connection, or in any other suitable manner. Further, back end server(s) 420 may connect to one or more devices in voice network 104 by a network, a direct connection, or in any other suitable manner.

Back end server(s) 420 may include, for example, a server providing a voice mail retrieval and notification function. For example, this voice mail retrieval and notification function may include the capability to receive notifications when a user receives a voice mail, physically call a user's voice mail system, enter the appropriate codes to retrieve the voice mail, retrieve the voice mail, convert the voice mail to a digital file, and send it to digital companion servers 406.

Additionally, back end server(s) 420 may also include, for example, a directory assistance server. This directory assistance server may, for example, interface service center 106 with a Reverse Directory Assistance Gateway (RDA Gateway) of voice network 104. A RDA Gateway is a device for issuing requests to a Data Operations Center (DOC) of voice network 104 for name and/or address information associated with a phone number and receiving the name and/or phone number in response to this request.

In another example, back end server(s) 420 may include a wireless internet gateway that is used for interfacing with a mobile switching center (MSC) of a wireless voice network. As with the above-described back end server(s) 420, this wireless internet gateway may be used for converting requests and information between the formats used by service center 106 and those used by the wireless voice network.

In yet another example, back end server(s) 420 may include a conference blasting server for instructing a conference bridge in the voice network 106 to dial out via an SSP to the participants of a voice conference. Or for example, the back end server(s) may include a server for instructing an IP of the voice network to place a call between two parties by dialing out to each of the parties. Back end server(s) 420 may also include the capability to instruct the bridge or IP device to call an audio digitizing device that can listen to the conference, convert the audio signals to digital format, and forward the digitized signals to a user device via, for example, an audio streaming server. The audio streaming server may, for example, allow a user to connect to it via, for example, the Internet. Additionally, the audio streaming device may buffer or record the signals to permit the user to pause, rewind, and/or fast-forward thru the conference.

In yet another example, back end server(s) 420 may include a Single Number Short Message Service (SN SMS) server for interfacing the service center 106 with a SMS gateway in voice network 104. This may be used for example to permit the customer to have SMS messages addressed to their home phone number directed to an SMS capable device of the user's choosing.

Voice network plane 508 includes the hardware and software included in voice network 104, as discussed above with reference to FIG. 3. For example, voice network plane 508 may include ISCP SPACE 314, ISCP 302, intelligent peripherals 320, and SSP 308. Additionally, voice network plane 508 may also include the hardware and software included in a wireless carrier's network, such as, for example, the mobile switching center, etc.

For clarity of explanation, system 100 is described herein with reference to the discrete functional elements illustrated in FIGS. 1-5. However, it should be understood that the functionality of these elements and modules may overlap and/or may exist in a fewer or greater number of elements and modules. Elements of system 100 may, depending on the implementation, lack certain illustrated components and/or contain, or be coupled to, additional or varying components not shown. Moreover, all or part of the functionality of the elements illustrated in FIGS. 1-5 may co-exist or be distributed among several geographically dispersed locations.

As described above, outgoing call information from any of a user's (e.g., 110) devices may be stored in a call log. As used herein, the term "log" refers to a compilation or listing of data. Forms of the term "log" also refer to the act of compiling, storing, and/or recording information. A "call log" refers herein to a log of information associated with outbound calls originating from one or more devices associated with a particular user. A "call" may include a telephone call placed from one or more communication devices (e.g., landline phone, cell phone, etc.). The term "call" may also encompass other types of communications, such as e-mails, instant messages, facsimiles, etc.

Figure 6:
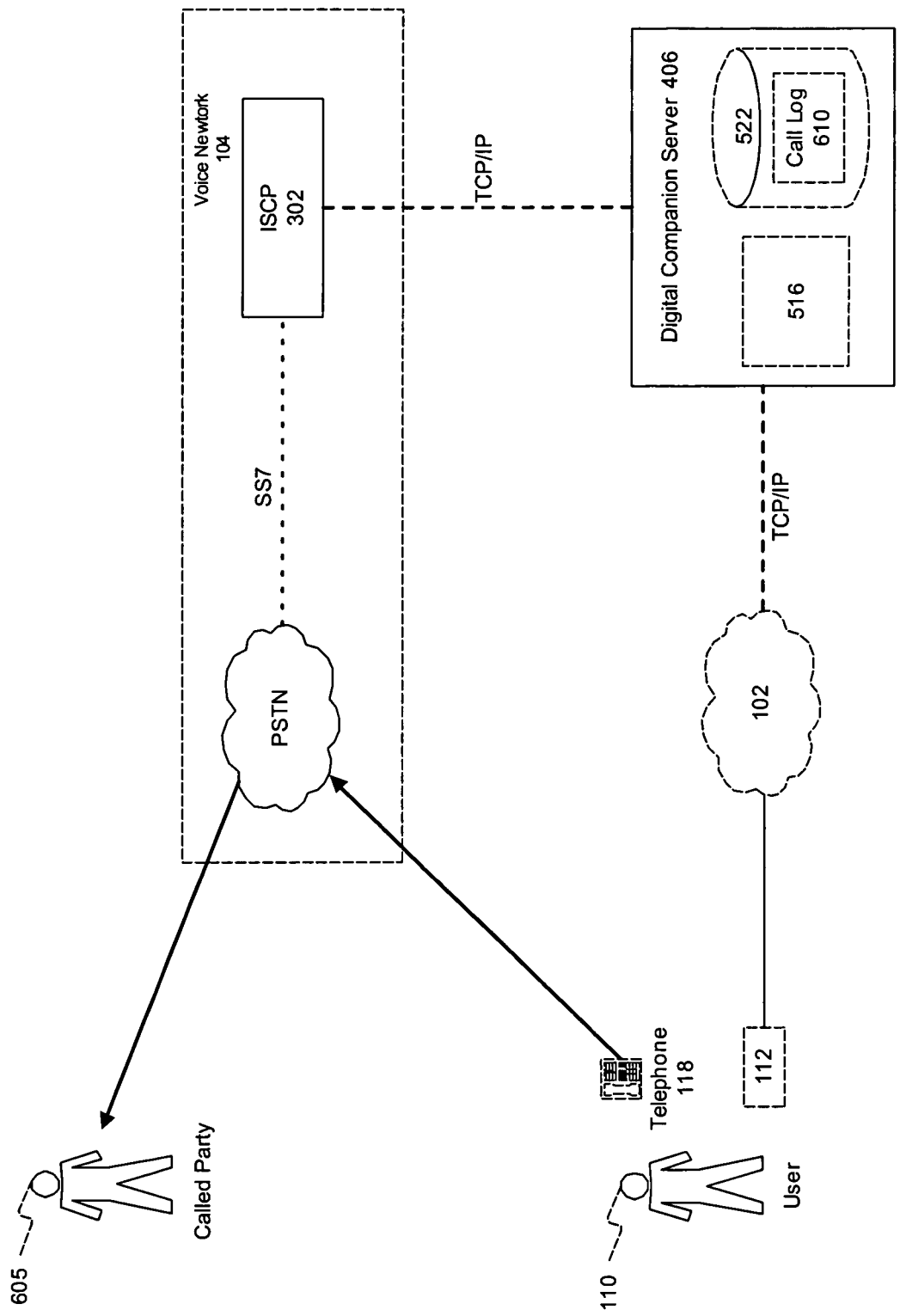
FIG. 6 is a diagram graphically illustrating methods consistent with certain embodiments of the present invention.

FIG. 6 diagrammatically illustrates an overview of call log processes and features consistent with certain embodiments of the present invention. As depicted in FIG. 6, user 110, as a calling party, may place a call using a calling device (e.g., telephone 118) to a called party 605. Methods and systems consistent with the present invention may obtain information associated with the outgoing call and store the information in a call log 610. In certain embodiments of the present invention, the call log may be implemented via one or more data files and/or structures residing on (or distributed among) one or more storage devices. For example, as illustrated in FIG. 6, call log 610 may be stored via database function 522. Additionally or alternatively, all or part of call log 610 may reside in storage 204 on user terminal 112. In one embodiment, call log 610 may include, for each outbound call, one or more of the following data elements: the dialed number, information associated with the calling device and/or party, information associated with the called device and/or party, and a time stamp.

In certain embodiments of the present invention, call log 601 may include or reference contact-related information associated with called parties. Consistent with principles of the present invention, such contact-related information may include one or more of a name, home address, business address, home telephone number, business telephone number, cell phone number, instant messenger address, IP address, biometric information (e.g., fingerprints, voice prints, retinal scans, etc.) visual information (e.g., digital images, photographs, etc.), audio information, personal information (e.g., birth date, favorite movies, favorite songs, etc.), public records, credit reports, police records, driving records, banking statements, and contact-related information associated with relatives and/or friends. In certain embodiments, contact-related information may include information associated with, or retrieved via, one or more networks.

User 110 may access call log 610 via, for example, user terminal 112 or telephone 118. In certain embodiments, information in the call log may be organized hierarchically, enabling users to explore detailed information (e.g., details of a specific call), as well as broader views (e.g., overall calling patterns, etc). Additional features associated with the call log are discussed below.

In exemplary embodiments, systems and methods consistent with the present invention may provide to the user filtering and/or processing options for the call log. For example, user 110 may set up an exclusion list in order to preclude entry of certain calls from the call log. The exclusion list may be based on, for example, any one or combination of the following: outgoing number types (e.g., 800 numbers, 411, etc.), called device types and called party location. Also, the exclusion list may, in one configuration, enable user 110 to exclude calls to certain parties during certain time periods. In one embodiment, user 110 may establish, access, and modify the exclusion list via user terminal 112 and digital companion server 406. Additional details of call log filtering and processing are discussed below.

In certain embodiments of the present invention, outgoing call information originating from a plurality of calling devices associated with a user may be logged and managed. For example, calls originating from a cell phone, landline phone (e.g., 118), and PDA associated with user 110 may be logged. User 110 may set specific filtering settings for logging calls placed from each calling device. In one embodiment, such filtering setting may be specified through the exclusion list. The exclusion list could therefore specify certain types of outgoing calls from each of a user's calling devices that should be excluded from the call log. For example, user 110 could exclude 800 calls from a landline phone and 411 calls from a cell phone. User 110 could also specify, for example, that all calls made from a particular device should be excluded from or included in the call log. User 110 could also specify that calls made to certain parties should be excluded from or included in the call log. Certain filtering settings may allow users to specify that calls made during a certain time period or time of day should be included or excluded in the call log. In addition, certain filtering settings may allow users to log (or exclude from the call log) all calls that fail or that are received by a message service. In certain embodiments, filtering settings may be dynamically changed for each of a user's devices. Information associated with outgoing calls from each device may be stored, subject to the filtering settings, in the call log. In certain implementations of the present invention, the type of information stored in the call log may vary for each calling device.

FIG. 7 is a flowchart depicting exemplary stages in a call log process consistent with certain embodiments of the present invention. The illustrated call log process may enable a user 110 to establish, set, and/or select filter parameters and/or preferences (i.e., build exclusion list) for the call log (stage 701). In one embodiment of the present invention, user 110 may set specific filter parameters for each of a plurality of devices, as discussed above. Application function 516 and/or user terminal 112 may, in certain implementations, include software, firmware, and/or hardware, for implementing filters, and a Graphical User Interface (GUI) for facilitating user access and interaction. In certain embodiments of the present invention, user 110 may access, input, and modify filtering parameters and/or preferences via user terminal 112.

As mentioned above, systems and methods consistent with the present invention may obtain information associated with outgoing calls. Obtaining information associated with outgoing calls may, in the call log process of FIG. 7, involve configuring one or more calling devices associated with user 110 (stage 710). In one embodiment of the present invention, user 110 may use a landline telephone coupled to voice network 104 in order to place calls to other parties. Accordingly, configuring calling devices may include setting an AIN (Advanced Intelligent Network) Off-Hook Delay ("OHD") trigger on a communication line associated with the landline telephone. The OHD trigger may be encountered in the call flow when the telephone goes "off hook" and the caller enters a number. That is, the OHD trigger may wait for a telephone number to be entered by a user.

In certain embodiments of the present invention, user 110 may use one or more programmable calling devices to place calls, such as a BREW phone, a J2ME phone, a PDA, and/or a laptop coupled to voice network 104. Such programmable calling devices may be compatible with PSTN and/or VoIP technology and, in certain implementations, be similar in structure to user terminal 112. Accordingly, configuring calling devices (stage 710) may include configuring the programmable calling device to capture and optionally cache outgoing call information, thereby enabling outgoing call information to be obtained. A programmable calling device may, in one embodiment, receive configuration data and/or instructions from server 406, which may cause the device to capture outgoing call information. Such data could, for example, be downloaded from the Internet or automatically transmitted from server 406 to the programmable calling device. A given programmable calling device may also be pre-configured to capture outgoing call information or configured by instructions input to a local storage drive (e.g., CD-ROM drive, floppy drive, etc.). As discussed above, information associated with outbound calls originating from a plurality of calling devices may be stored in the call log. Accordingly, OHD triggers may be set for one or more landline phones and one or more programmable calling devices may be configured to capture outgoing call information, thereby enabling outgoing call information from each calling device to be obtained.

Consistent with principles of the present invention, user 110 may initiate a call to a called party 605 (stage 720). In certain embodiments, user 110 may place a call via one or more landline telephones, wireless telephones, pagers, etc. Additionally or alternatively, user 110 could place a call via one or more digital cell phones, PDAs, J2ME phones, BREW phones, laptops, and/or other programmable calling devices. Telephony services may be provided by voice network 104.

Once user 110 initiates a call, the process of FIG. 7 may obtain information associated with the outbound call (stage 730). In one example, such information may include the dialed number and a time of placing the call. For landline phones, the illustrated process may involve querying AIN SCP (302) in voice network 104. For example, when the handset of a landline telephone goes "off-hook" and user 110 enters the called party number, the OHD trigger may cause a query to be transmitted to the AIN SCP (302). Upon receiving the query, a Service Logic Program (SLP) in ISCP 302 for the subscriber's line may be initiated. The SLP may include one or more hardware, software, and/or firmware components for processing call information and/or routing call information among and between various components and/or systems included in (or coupled to) service center 106. The SLP in ISCP 302 may use GDI TCP/IP to transmit information associated with the outgoing call, including the outbound dialed number, to digital companion server 406 in service center 106 (stage 740).

With programmable calling devices, obtaining information associated with outbound calls (stage 730) may involve capturing call information via the calling device. Accordingly, the calling device may transmit (stage 740) the captured outgoing call information to digital companion server 406 in service center 106. In certain embodiments of the present invention, the call information may be transmitted from the programmable calling device to service center 106, via network 102 and/or network 104 when the call is made. However, the outbound call information may, additionally or alternatively, be transmitted from the programmable calling device subsequent to the occurrence of the outbound call and/or in response to a request from server 406. Outgoing call information may be transmitted wirelessly to service center 106. In alternative embodiments, outgoing call data may be transmitted over a wired network link and may be transmitted via TCP/IP.

Upon receiving the outgoing call information (stage 740), server 406 may route the information to application function 516 for processing. In certain implementations, application function 516 may determine (stage 750) whether or not the outbound call information should be included in the call log. Application function 516 may use the filtering parameters (stage 701) to determine whether a particular call should be logged. In alternative embodiments, the determination of whether the call should be logged (stage 750) may be performed by ISCP 302 and may occur prior to transmitting the call information to application function 516. If it is determined that the call should be excluded from the call log (e.g., because the dialed number is included in the exclusion list), processing of the call may cease and application 516 may standby for additional outbound calls (stage 720). If, however, it is determined that the outbound call should be logged (stage 750), application function 516 may log the outgoing call information (stage 760). In one embodiment of the present invention, outgoing call information may be logged in call log 610, which may, as explained above, be stored via database function 522. As mentioned above, information logged in call log 610 may include the dialed number, information associated with the calling and/or called device, and a time stamp indicating when the call was placed.

Once the outgoing call information is logged (stage 760), the illustrated process may provide the user with access to the call log (stage 770). Providing access may involve visually and/or audibly presenting information in the call log to user 110. In one embodiment of the present invention, the stored information may be displayed to and/or accessed by user 110 via user data network 120 and/or voice network 104. For example, user 110 may access the call log via user terminal 112_A and/or 112_B coupled to data network 120. Additionally or alternatively, user 110 may access the call log via voice network 104 through, for example, voice portal 414. In certain embodiments of the present invention, user 110 may access the call log via one or more calling devices (e.g., a digital cell phone coupled to data network 120 and/or voice network 104).

The steps illustrated in the flowchart of FIG. 7 are consistent with exemplary implementations of the instant invention. Further, it should be understood that the sequence of events described in FIG. 7 are exemplary and not intended to be limiting. Thus, other method steps may be used, and even with the method depicted in FIG. 7, the particular order of events may vary without departing from the scope of the present invention. For example, filter parameters (e.g., the exclusion list) may be set (stage 701), accessed, and modified at any time. Also, calling devices may be configured (stage 710) prior to the user setting filters (stage 701). Moreover, certain steps may not be present and additional steps may be implemented in FIG. 7.

Consistent with principles of the present invention, various operations and analyses may be performed using the call log. In certain embodiments, the call log may be used to add contacts to a contact list (e.g., the above-mentioned address book stored via contacts database 530). Server 406 may, in certain implementations, permit a customer to add contacts to a contact list or address book. User 110 may access the contact list via user terminal 112 and/or voice network 104. The contact list may include names, business and/or home addresses, e-mail addresses, contact numbers, facsimile numbers, and/or other identifying information associated with contacts. In one embodiment, the dialed number may be inserted from the call log into the contact list. In addition, or as an alternative, contact-related information may be obtained and inserted in the contact list when a contact is added. Contact information associated with a particular called party may be obtained using information (e.g., the dialed number) listed in the call log.

Consistent with embodiments of the present invention contact-related information may be obtained via one or more networks and/or network-based services. In certain embodiments, methods and systems may leverage one or more elements included in or coupled to service center 106 and/or voice network 104 may to retrieve contact information. In one example, back end server 420 may include or be configured as a Reverse Directory Assistance (RDA) server. As such, back end server 420 may interface service center 106 with an RDA Gateway of voice network 104 and may be leveraged by one or more RDA processes to retrieve contact information associated with logged dialed numbers. In certain embodiments of the present invention, the RDA Gateway may accept messages and requests from back end server 420, issue requests/queries for contact information to the DOC of voice network 104, and provide responsive information, including the contact information, back to server 420.

In certain embodiments, application server function 528 in communication portal server 408 may retrieve contact information associated with logged dialed numbers from sources such as web based services 552.

Contacts may be added to the contact list automatically and/or on demand. That is, the dialed number and/or contact information associated with a called party may be automatically added to the contact list in response to an outbound call to the called party or may be added to the contact list in response to a command from user 110. For example, back end server 420 may, in conjunction with service center 106 (e.g., servers 406 and/or 408) and voice network 104, automatically retrieve and add contact information associated with a called party to the contact list when application function 516 receives the outbound call information (stage 740). In certain embodiments of the present invention, contacts are added to the contact list once, regardless of the number of calls to that dialed number. Methods and systems consistent with the present invention may determine whether a particular dialed number represents a new contact or one that was previously logged or entered in the contact list by user 110. In one configuration, server 406 (e.g., via application function 516) and/or back end server 420 (e.g., configured as an RDA server) may perform this determination. If a given dialed number was previously logged or entered, the current outbound call may not be added. If, however, the dialed number in the call log represents a new contact, a new contact entry may be created and contact information associated with the number may be retrieved and added to the contact list, thereby adding the new contact to the contact list. In certain embodiments, user 110 could be notified via user terminal 112 of additions to the contact list.

Additionally, a user may cause or initiate the addition of a contact to the contact list. In certain embodiments, user 110 may be prompted to specify whether a called party should be placed in the contact list. For example, server 406 may prompt user 110 via user terminal 112 to specify whether or not a called party should be inserted in the contact list at the time of the outbound call to that party. Users could also add previously called parties to the contact list via the call log. In one example, a user may select a dialed number in the call log and, in response, contact information associated with the dialed number may be retrieved (e.g., via RDA processes) and added to the contact list. If the contact is not a new contact, a corresponding message may be displayed to the user, and the user may be prompted to specify whether the contact should be added. In exemplary embodiments of the present invention, the user may specify and alter the manner in which contacts are added to the contact list via, for example, user terminal 112, which may interface with elements in server 406, communication portal server 408, and/or back end server 420. For example, user 110 may set and change preferences via application function 516. In addition, user 110 may dynamically change the manner in which contacts are added to the contact list at any time. In one implementation of the invention, user 110 may set contact list preferences for the call log when filters are set (stage 701).

In certain embodiments of the present invention, data analyses may be performed using the call log. For example, the call log may enable a user to view calling patterns and/or frequencies. In one instance, a user could view all outgoing calls (or those to a particular party) occurring in a particular time period (e.g., one month). In certain embodiments, data analyses may be device-specific. That is, data analyses may be performed for each of the user's calling devices. In one example, the user could view calling patterns for and/or the calls originating from each of a plurality of calling devices. Further, one or more different analyses could be performed for each calling device, depending on device type and/or user-specified parameters and instructions.

In exemplary implementations, server 406 may be configured to perform such analyses (e.g., via application function 516) using the call log. Additionally or alternatively, user terminal 112 may include program code for performing the analyses. The results of the analyses may, in one example, be stored by database function 522 and/or storage 204. The user may access results of the analyses via user data network 120 and/or voice network 104. In one example, a user may access the call log (stage 770) and then initiate certain analyses and view results. Additionally or alternatively, the user may preset analyses to be performed and set parameters associated with such analyses in a manner similar to that described above in connection with stage 701 of FIG. 7. Users may then automatically receive (via data network 120 and/or voice network 104) analyses reports periodically and/or upon viewing the call log.

Embodiments consistent with the invention may be implemented in various environments. Further, the processes described herein are not inherently related to any particular apparatus and may be implemented by any suitable combination of components. Moreover, various types of general purpose devices may be used in accordance with the teachings described herein.

The exemplary systems and methods consistent with present invention described above are illustrative rather than restrictive. Different combinations of hardware, software, and firmware may be suitable for practicing embodiments of the present invention.

The present invention has been described in relation to particular examples which are intended in all respects to be illustrative rather than restrictive. Different combinations of hardware, software, and firmware may be suitable for practicing embodiments of the present invention.

Additionally, other embodiments of the invention will be apparent to those skilled in the art from consideration of the specification and practice of the invention disclosed herein. It is intended that the specification and examples be considered as exemplary only. To this end, it is to be understood that inventive aspects lie in less than all features of a single foregoing disclosed embodiment, implementation, or configuration. Thus, the true scope and spirit of the invention depends on the following claims.

What is claimed is:

1. A method for logging calls comprising the steps implemented by one or more computers of:
   receiving, from a user of a calling device, instructions that specify filter settings for logging outgoing calls to a plurality of parties in a call log, wherein the instructions indicate that calls from the user of the calling device to a first one of the parties are to be excluded from the call log;
   obtaining outgoing call information associated with an outgoing call originating from the calling device and destined to a called device associated with one of the parties, the outgoing call information reflecting a dialed number;
   determining whether or not to log the outgoing call information based on the filter settings; and
   storing the outgoing call information in the call log in response to a determination to log the outgoing call information.

2. The method of claim 1, further comprising:
   providing the user of the calling device with access to the call log.

3. The method of claim 1, wherein obtaining outgoing call information further comprises obtaining information associated with the user of the calling device and the party associated with the called device.

4. The method of claim 1, wherein obtaining information associated with all the user of the calling device and the party associated with the called device includes obtaining a calling party telephone number and the dialed telephone number, respectively.

5. The method of claim 1 further comprising:
   retrieving contact-related information associated with user of the called device, using the outgoing call information; and
   adding the contact information to a contact list.

6. The method of claim 5, wherein retrieving contact-related information includes retrieving at least one of a name, a home address, a business address, or an e-mail address associated with the user of the called device.

7. The method of claim 5, wherein retrieving contact-related information includes retrieving a photograph.

8. The method of claim 5, wherein retrieving contact-related information includes retrieving information included in a public record.

9. The method of claim 1 further comprising:
   performing at least one data analysis using the call log.

10. The method of claim 9, wherein performing at least one data analysis includes displaying outgoing call patterns.

11. The method of claim 1, wherein receiving instructions from the user of the calling device that specify filter settings includes receiving instructions that indicate at least one outgoing call to include in the call log.

12. The method of claim 1, wherein determining whether or not to log the outgoing call information includes consulting the filter settings.

13. The method of claim 1, wherein the calling device is a landline telephone and wherein obtaining outgoing call information includes:
   setting a trigger on a communication line associated with the landline telephone;
   querying a service control point in response to the trigger; and
   initiating a service logic program in the service control point.

14. The method of claim 13 further including:
   transmitting at least the dialed telephone number to a server from the service logic program.

15. The method of claim 1, wherein the calling device is a programmable device and wherein obtaining outgoing call information includes capturing the outgoing call information by the programmable device.

16. The method of claim 15 further including:
   transmitting at least dialed telephone number to a server from the programmable device.

17. A call log system comprising:
   a first network providing telephony services;
   a calling device input port, coupled to the first network, configured to interface a user with the first network;
   a second network for facilitating data transfer;
   a service center coupled to the first network and the second network, the service center comprising:
      a first application function for generating a call log according to user-specified preferences, the call log including information associated with telephone calls originating from a user of a calling device to a plurality of parties, wherein the preferences indicate that calls from the user of the calling device to a first one of the parties are to be excluded from the call log; and
      a storage function for storing the call log;
   a user terminal input port, coupled to the second network and configured to interact with the service center, for enabling the user of the calling device to specify the preferences and access the call log.

18. The system of claim 17, wherein the first network is a Public Switched Telephone Network (PSTN).

19. The system of claim 17, wherein the first network is operable to perform Voice over Internet Protocol (VoIP).

20. The system of claim 17, wherein the first network includes a Public Switched Telephone Network (PSTN) and wherein the calling device input port is an interface receiving information from a landline telephone.

21. The system of claim 20, wherein the information associated with the telephone calls includes a dialed telephone number and wherein a service control point coupled to the PSTN transmits the dialed telephone number to the server.

22. The system of claim 17, wherein the calling device input port is an interface receiving information from a programmable device.

23. The system of claim 22, wherein the information associated with the telephone calls includes at least a dialed telephone number and wherein the dialed telephone number is received by the service center.

24. The system of claim 17, wherein the second network includes at least one of a wide area network (WAN), a local area network (LAN), an intranet, and the Internet.

25. The system of claim 17, wherein the storage function includes at least one database.

26. The system of claim 17, wherein the application function includes program code for performing at least one data analysis using the call log.

27. The system of claim 26, wherein the data analysis includes determining outgoing call patterns.

28. The system of claim 17, wherein the service center retrieves, via a second application function, contact information associated with recipients of the telephone calls originating from the calling device using the call log.

29. The system of claim 28, wherein the information associated with the telephone calls includes at least dialed telephone numbers and wherein the second application function retrieves contact information associated with at least one of the dialed telephone numbers from an Internet-based service.

30. The system of claim 28, wherein the contact information includes at least one of a name, a home address, a business address, or an e-mail address.

31. The system of claim 28, wherein the service center further comprises a contacts database function configured to store the retrieved contact information.

32. The system of claim 17, wherein the user terminal is one of a general purpose computer, a personal computer, a wireless device, a pager, a mobile phone having data access functions, and a Personal Digital Assistants (PDA).

33. A computer-readable medium containing instructions for controlling a system to perform a method, the system including at least one processor for executing the instructions, the method comprising:

receiving, from a user of a calling device, instructions that specify filter settings for logging outgoing calls to a plurality of parties in a call log, wherein the instructions received from the user indicate that calls from the user of the calling device to a first one of the parties are to be excluded from the call log;

obtaining outgoing call information associated with an outgoing call originating from the calling device and destined to a called device associated with one of the parties, the outgoing call information reflecting a dialed number;

determining whether or not to log the outgoing call information based on the filter settings; and storing the outgoing call information in the call log in response to a determination to log the outgoing call information.

34. The method according to claim 5, wherein the dialed number is added to the contact list automatically.

35. The method according to claim 5, wherein the dialed number is added to the contact list in response to a command from the user.

36. The method according to claim 1, further comprising retrieving contact information associated with the dialed number in the log using reverse directory assistance.

* * * * *